US011973535B2

(12) United States Patent
Moriwaki et al.

(10) Patent No.: US 11,973,535 B2
(45) Date of Patent: Apr. 30, 2024

(54) WAVELENGTH MONITORING CIRCUIT

(71) Applicant: Nippon Telegraph and Telephone Corporation, Tokyo (JP)

(72) Inventors: Osamu Moriwaki, Musashino (JP); Manabu Oguma, Musashino (JP); Kenya Suzuki, Musashino (JP); Takashi Go, Musashino (JP); Yuichiro Ikuma, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 336 days.

(21) Appl. No.: 17/424,733

(22) PCT Filed: Jan. 17, 2020

(86) PCT No.: PCT/JP2020/001511
§ 371 (c)(1),
(2) Date: Jul. 21, 2021

(87) PCT Pub. No.: WO2020/153256
PCT Pub. Date: Jul. 30, 2020

(65) Prior Publication Data
US 2022/0011508 A1  Jan. 13, 2022

(30) Foreign Application Priority Data

Jan. 25, 2019  (JP) ................. 2019-010816

(51) Int. Cl.
*H04B 10/079* (2013.01)
*G01J 3/45* (2006.01)
(Continued)

(52) U.S. Cl.
CPC .......... *H04B 10/07957* (2013.01); *G01J 3/45* (2013.01); *H04B 10/079* (2013.01);
(Continued)

(58) Field of Classification Search
CPC .... H04B 10/07957; G02B 2006/12159; G02B 2006/12164; G02B 6/125; G01J 9/0246; G01J 3/45
See application file for complete search history.

(56) References Cited

U.S. PATENT DOCUMENTS

2011/0122906 A1* 5/2011 Seeley .................... H01S 5/143
356/477
2012/0082414 A1* 4/2012 Sakamaki .............. H04B 10/65
385/31
(Continued)

FOREIGN PATENT DOCUMENTS

JP    5243607 B2    4/2013
JP    6176784 B2    7/2017

*Primary Examiner* — Michelle R Connelly
(74) *Attorney, Agent, or Firm* — Workman Nydegger

(57) ABSTRACT

A wavelength monitoring circuit obtains a light output proportional to only an input optical signal, independent of wavelength, by adding a light split circuit to the configuration in the related art, or changing the light split circuit to a light trifurcation circuit. In addition, wavelength monitoring with high accuracy is possible while improving the resistance to noise. The extraction of the light output proportional to only the input optical signal is performed by a light split circuit for input light at the top stage of the wavelength monitoring circuit or a light split circuit for interference in a stage in the middle of the circuit. The changed light split circuit causes the MZI included in the wavelength monitoring circuit to operate in a state of losing the balance of the configuration or the optical signal level, and increases the signal level near the bottom portion of the transmission characteristics.

9 Claims, 8 Drawing Sheets

(51) Int. Cl.
*G02B 6/12* (2006.01)
*G02B 6/125* (2006.01)
*H04B 10/572* (2013.01)
*H04J 14/02* (2006.01)

(52) U.S. Cl.
CPC ....... *H04B 10/572* (2013.01); *G02B 6/12009* (2013.01); *G02B 2006/12159* (2013.01); *G02B 2006/12164* (2013.01); *G02B 6/125* (2013.01); *H04J 14/02* (2013.01)

(56) References Cited

U.S. PATENT DOCUMENTS

| 2015/0076990 | A1* | 3/2015 | Uesaka | G01J 1/4257 |
| | | | | 315/151 |
| 2015/0085292 | A1* | 3/2015 | Uesaka | G02B 6/12007 |
| | | | | 356/477 |
| 2018/0183517 | A1* | 6/2018 | Sugiyama | H04B 10/07957 |

* cited by examiner

WAVELENGTH MONITORING CIRCUIT

BACKGROUND ART

The present disclosure relates to an optical device used in an optical communication network, and particularly relates to a wavelength monitoring circuit and a wavelength monitoring system.

As the Internet and small portable information terminals are widely used, demand for data communication networks continues to increase at an explosive rate. A technology such as Wavelength Division Multiplexing (WDM) communication is used to increase the capacity of optical communication network that supports this. In the wavelength division multiplex communication, a laser module that controls the oscillation wavelength with high accuracy is necessary, and there is a need for a wavelength monitoring circuit and a wavelength monitoring method for efficiently and accurately monitoring the oscillation wavelength of the laser module.

FIG. 6 is a diagram illustrating a conceptual configuration of a wavelength monitoring circuit in the related art. A typical wavelength monitoring circuit 600-1 includes a beam splitter 602 that splits a portion of the output light of a wavelength-variable laser 601, and a beam splitter 603 that further splits the split light into two beams. One of the split light that is obtained by splitting by the beam splitter 603 is input to a photo diode (PD) 604 that monitors light intensity. The other split light that is split by the beam splitter 603 is input to a filter with periodic transmission characteristics, typically an Etalon filter 605. The split light transmitted through the Etalon filter 605 is input to the photo diode 606 that monitors the light intensity.

At a certain wavelength, the ratio $I_{PD2}/I_{PD1}$ of the output current $I_{PD2}$ of the PD 606 to the output current $I_{PD1}$ of the PD 604 indicates the transmittance of the Etalon filter 605 at that wavelength, so long as the two PDs 604 and 606 have the same detection sensitivity. Thus, by creating a correspondence table between the transmittance of the Etalon filter 605 and the wavelength of the optical signal in advance, the wavelength of the optical signal input to the wavelength monitoring circuit can be known. Further, the transmittance of the Etalon filter 605 with respect to the desired wavelength is obtained in advance, and the laser module is controlled such that the transmittance value and the ratio $I_{PD2}/I_{PD1}$ match, thus the oscillation wavelength can be controlled to a desired wavelength.

As described above, in the Etalon filter, a transmission waveform with periodic transmission peaks is obtained in the wavelength (frequency) region. In the configuration of the wavelength monitoring circuit illustrated in FIG. 6, when the wavelength of the optical signal to be monitored is located at the peak or bottom of the transmittance characteristic of the Etalon filter 605, the value of the ratio $I_{PD2}/I_{PD1}$ hardly changes with respect to the minute change in the wavelength of the optical signal. The accuracy of determining the optical signal wavelength based on the ratio $I_{PD2}/I_{PD1}$ obtained from the current value of the PD deteriorates in the wavelength band where the transmission characteristic peaks or bottoms, and the wavelength cannot be determined with high accuracy. As a configuration to compensate for the shortcomings of the wavelength monitoring circuit illustrated in FIG. 6 where there are wavelength bands that are not suitable for use, there is a wavelength monitoring circuit that utilizes two different filter characteristics to be described below.

FIG. 7 is a diagram illustrating a configuration of an improved wavelength monitoring circuit according to the related art. In comparison with the configuration of the wavelength monitoring circuit 600-1 of FIG. 6, the improved wavelength monitoring circuit 600-2 further includes a beam splitter 607 between the beam splitter 603 and the Etalon filter 605. The split light that is further split by the additional beam splitter 607 is transmitted through the second Etalon filter 608 and then input to the photo diode 609. Here, the second Etalon filter 608 has the same periodic filter characteristic as that of the Etalon filter 605, but has the transmission characteristic which is offset by ¼ of the repetition period.

When the output current of the photo diode 609 is described as $I_{PD3}$, the ratio $I_{PD3}/I_{PD1}$ to the output current $I_{PD1}$ of the PD 604 indicates the transmittance, for the second Etalon filter 608. Because the two transmission characteristics are offset by ¼ of the repetition period, the transmittance $I_{PD3}/I_{PD1}$ of the second Etalon filter 608 is not located at either the peak or the bottom when the $I_{PD2}/I_{PD1}$ is located at the peak or the bottom. Further, because the reverse condition is also established, the wavelength can be known with high accuracy regardless of the wavelength of the optical signal, by selecting an appropriate transmittance $I_{PD2}/I_{PD1}$ or $I_{PD3}/I_{PD1}$ of the Etalon filter for each wavelength of the optical signal (Patent Literature 1).

In the wavelength monitoring circuit 600-2 illustrated in FIG. 7, a circuit including the beam splitter 607 and the Etalon filters 605 and 608, and having two different transmission characteristics which are offset by ¼ of one period may also be configured with a planar lightwave circuit (PLC). By configuring a portion of the wavelength monitoring circuit having two periodic filter characteristics described above with PLC, alignment between the components is unnecessary, and the productivity of the wavelength monitoring circuit can be improved.

FIG. 8 is a diagram illustrating an example of a circuit arrangement in a case where a portion of the wavelength monitoring circuit is produced by PLC. In the filter circuit 801 of the wavelength monitoring circuit, the optical signal 810 input to the input port 811 is split by the light bifurcation circuit 802, and the split light is input to two arm waveguides 809a, 809b having different optical path lengths of the optical delay unit 803. After the two beams of split light are given a delay time difference by the optical delay unit 803, one of split light beams from the optical delay unit 803 is further split by a light bifurcation circuit 804 that outputs optical signals having the same phase. The other split light from the optical delay unit 803 is further split by a light bifurcation circuit 805 that outputs optical signals having a phase difference of 90 degrees. The split light from each of the two light bifurcation circuits 804 and 805 is multiplexed and interfered by a first two-input two-output optical multiplexer/demultiplexer circuit 807a and a second two-input two-output optical multiplexer/demultiplexer circuit 807b via a waveguide group 806 of equal length, and output as interference light 812a and 812b.

The optical signals input to the first two-input two-output optical multiplexer/demultiplexer circuit 807a are one of the outputs of the light bifurcation circuit 804 that outputs optical signals having the same phase, and one of the outputs of the light bifurcation circuit 805 that outputs optical signals having a phase difference of 90 degrees. The optical signals input to the second two-input two-output optical multiplexer/demultiplexer circuit 807b are the other of the outputs of the light bifurcation circuit 804 that outputs optical signals having the same phase, and the other of the outputs of the light bifurcation circuit 805 that outputs optical signals with a phase difference of 90 degrees.

Attention is paid to 812a that is one of the optical signals output from the first two-input two-output optical multiplexer/demultiplexer circuit 807a and 812b that is one of the optical signals output from the second two-input two-output optical multiplexer/demultiplexer circuit 807b. These optical signals 812a and 812b are each passed through the filter characteristics of periodic transmission characteristics, and the two transmission characteristics offset by ¼ of one period (Patent Literature 2). Therefore, by using the optical signal 812a and 812b obtained from the filter circuit 801 of FIG. 8, the wavelength can be known with high accuracy regardless of the wavelength of the optical signal, similar to the improved wavelength monitoring circuit 600-2 of FIG. 7. The filter circuit 801 in FIG. 8 is provided with elements necessary for the wavelength monitoring circuit by further adding functions of the beam splitter 603 or the like for input light separation in FIG. 7, and it can be implemented also by using a PLC that does not require alignment between the components.

CITATION LIST

Patent Literature

Patent Literature 1: JP 6176784 B Specification
Patent Literature 2: JP 5243607 B

SUMMARY OF THE INVENTION

Technical Problem

The filter circuit 801 according to the PLC in FIG. 8 is used as a decoder of a phase modulation signal such as differential phase shift modulation (DPSK) in an optical transceiver that converts the phase modulation signal into an intensity modulated signal. In these applications, the phase modulation signal is converted into 1 and 0 intensity modulation signals with a high extinction ratio so that the splitting ratios of the light bifurcation circuits 802, 804, and 805 and the two-input two-output optical multiplexer/demultiplexer circuits 807a and 807b are 50%, and the wavelength dependence of the transmission characteristics of the filter is increased. Thus, the intensity change rate of the output signal light when the wavelength of the input signal light changes slightly is increased, and the intensity change rate of the electrical signal by the PD is increased, and the accuracy of the wavelength detection is improved.

However, when attempting to apply the filter circuit of FIG. 8 to the wavelength monitoring circuit, the light intensity of the output signal light near the bottom of the transmission characteristics of the filter becomes weak as a tradeoff for increasing the accuracy of wavelength detection. The filter circuit 801 of FIG. 8, which includes two arm waveguides 809a and 809b with an optical path length difference, constitutes a Mach-Zehnder interferometer (MZI) as a whole, and the transmittance drops to near 0% at the bottom of the transmission characteristics at the MZI with high balance. Because at the bottom and the vicinity of the bottom of the transmission characteristics, not only the detection accuracy of the wavelength deteriorates, but also the optical signal level itself becomes low, when the optical noise signal is present, there is a problem that the accuracy of the wavelength determination deteriorates significantly.

In light of the foregoing, an object of the present disclosure is to provide a wavelength monitoring circuit and a wavelength system which are resistant to optical noise signals.

Means for Solving the Problem

From the viewpoint of achieving such an object, a present disclosure according to first aspect is a wavelength monitoring circuit including an input light split circuit configured to split an input optical signal into three signals, and output first split light as a first light output, an optical delay unit configured to give a time delay difference to second split light and third split light which are outputs from the input light split circuit, a light split stage including a first light split unit configured to further split one of optical signals output from the optical delay unit into optical signals having an identical phase, and a second light split unit configured to further split another one of the optical signals output from the optical delay unit into optical signals having a phase difference of 90 degrees, and a light multiplexing stage including a first light multiplexing circuit configured to obtain a second light output, which is interference light, by multiplexing one of the optical signals having the identical phase from the first light split unit and one of the optical signals having the phase difference of 90 degrees from the second light split unit, and a second light multiplexing circuit configured to obtain a third light output, which is interference light, by multiplexing another one of the optical signals having the identical phase from the first light split unit and another one of the optical signals having the phase difference of 90 degrees from the second light split unit, and connecting to the light split stage via waveguides having an equal length, in which a wavelength of the input optical signal is determined, based on an electrical output obtained from the second light output and an electrical output obtained from the first light output, or an electrical output obtained from the third light output and the electrical output obtained from the first light output. A splitting ratio of the second split light and the third split light from the input light split circuit can be configured not to be equal to one another.

The disclosure according to second aspect is the wavelength monitoring circuit according to first aspect, in which the input light split circuit includes a first input light split unit configured to receive the input optical signal, and output one of split light beams from the first input light split unit to the optical delay unit as the second split light, and a second input light split unit configured to receive another one of the split light beams from the first input light split unit, output one of split light beams from the second input light split unit to the optical delay unit as the third split light, and output another one of the split light beams from the second input light split unit as the first light output. This corresponds to the wavelength monitoring circuit of a first embodiment.

The disclosure according to third aspect is the wavelength monitoring circuit according to first aspect, in which the input light split circuit is a light trifurcation circuit configured to output the first split light, the second split light, and the third split light, and a splitting ratio of the second split light and the third split light is not equal (1:1). This corresponds to the wavelength monitoring circuit of a second embodiment.

The disclosure according to fourth aspect is a wavelength monitoring circuit including an input light split circuit configured to split an input optical signal, an optical delay unit configured to give a time delay difference to two beams of split light from the input light split circuit, a light split stage including a light trifurcation unit configured to split one of optical signals output from the optical delay unit into first split light, second split light, and third split light, and to output the first split light as a first light output and a light bifurcation unit configured to split another one of the optical signals output from the optical delay unit, in which, when the second split light and the third split light have an identical phase, split light beams from the light bifurcation unit have a phase difference of 90 degrees, and, when the second split light and the third split light have a phase difference of 90 degrees, the split light beams from the light bifurcation unit have an identical phase, and a light multiplexing stage including a first light multiplexing circuit configured to obtain a second light output, which is interference light, by multiplexing the second split light from the light trifurcation unit and one of the split light beams from the light bifurcation unit, and a second light multiplexing circuit configured to obtain a third light output, which is interference light, by multiplexing the third split light from the light trifurcation unit and another one of the split light beams from the light bifurcation unit, and connecting to the light split stage via waveguides having an equal length, in which a wavelength of the input optical signal is determined, based on an electrical output obtained from the second light output and an electrical output obtained from the first light output, or an electrical output obtained from the third light output and the electrical output obtained from the first light output. Here, the first light output corresponds to an output proportional to only the light intensity of the input optical signal.

The disclosure according to fifth aspect is the wavelength monitoring circuit according to fourth aspect, in which the light trifurcation unit outputs second split light and third split light having an identical phase. This corresponds to the wavelength monitoring circuit of a third embodiment. The splitting ratio of the light trifurcation unit may also be 2:1:1 with the first split light:the second split light:the third split light.

The disclosure according to sixth aspect is the wavelength monitoring circuit according to fourth aspect, in which the light trifurcation unit outputs the second split light and the third split light having a phase difference of 90 degrees. This corresponds to the wavelength monitoring circuit of a fourth embodiment. The splitting ratio of the light trifurcation unit may also be 1:1:1.

The disclosure according to seventh aspect is the wavelength monitoring circuit according to any one of first to sixth aspects, which is configured with a planar optical circuit formed on an identical substrate.

The disclosure according to eighth aspect is a wavelength monitoring system including the wavelength monitoring circuit according to any one of first to seventh aspect, a memory configured to store, in advance, correspondence relationship information between a value of a first ratio of the electrical output obtained from the second light output and the electrical output obtained from the first light output, a value of a second ratio of the electrical output obtained from the second light output and the electrical output obtained from the first light output, and a wavelength, and a control unit configured to calculate the value of the first ratio and the value of the second ratio that are obtained from the first light output, the second light output, and the third light output from the wavelength monitoring circuit, and determine a wavelength of the input optical signal, based on the correspondence relationship information.

Effects of the Invention

A wavelength monitoring circuit and a wavelength monitoring system that are strong with respect to optical noise signals can be achieved.

DESCRIPTION OF EMBODIMENTS

With the wavelength monitoring circuit of the present disclosure, by simply adding a light split circuit to the configuration in the related art or changing the circuit to a light trifurcation circuit, a light output proportional to only the input optical signal, independent of a wavelength, is obtained, and wavelength can be monitored with high accuracy, while the resistance to noise is easily improved. As a location for extracting the light output proportional to only the input optical signal, a light split circuit for input light at the top stage of the wavelength monitoring circuit, and a light split circuit for interference in a stage in the middle of the circuit can be used. The added or changed light split circuit operates to unbalance the circuit configuration or the optical signal level of the MZI configured in the wavelength monitoring circuit. In the transmission characteristics of the filter circuit achieved by MZI, by unbalancing the MZI, the level of the bottom portion is raised, and avoiding deterioration of the detection accuracy of the wavelength, and the problem of weakness to the optical noise signal.

The wavelength monitoring circuit of the present disclosure can be configured with a planar optical circuit such as a PLC. The wavelength monitoring circuit of the present disclosure acquires a relationship between the value of the ratio of the electrical outputs and the wavelength in advance, and holds the relationship in the memory as a table, for example, and the memory and the wavelength monitoring circuit may be mounted as a part of another optical signal processing apparatus. In this case, the wavelength monitoring circuit of the present disclosure can also operate as a wavelength monitoring system in cooperation with, for example, the control unit such as a CPU and the above-described memory of the optical signal processing apparatus. Examples of the optical signal processing apparatus that can include the wavelength monitoring circuit according to the present disclosure include a laser module, a wavelength meter, an optical component tester, and the like.

Hereinafter, the configuration and operation of the wavelength monitoring circuit according to the present disclosure will be described with various embodiments.

First Embodiment

Figure 1:
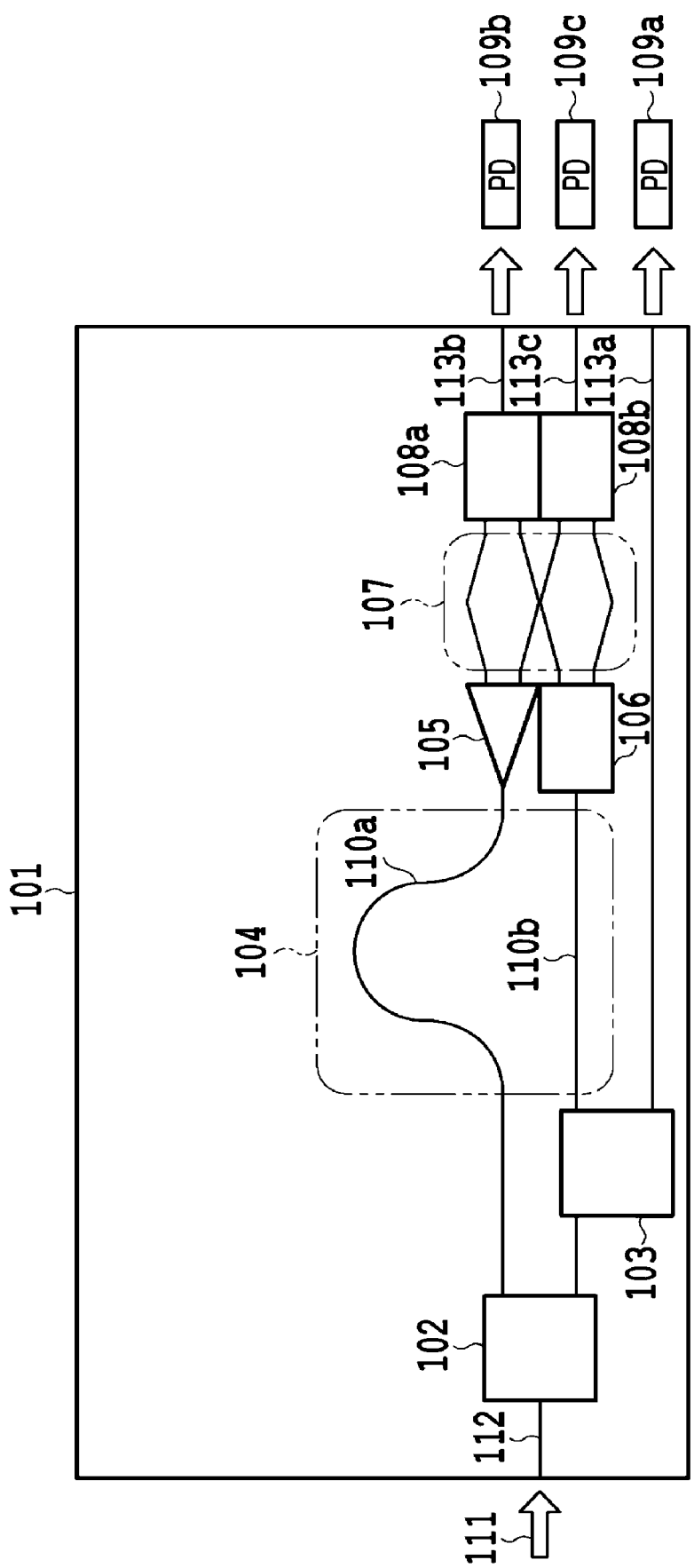
FIG. 1 is a diagram illustrating a configuration of a wavelength monitoring circuit according to a first embodiment of the present disclosure.

FIG. 1 is a diagram illustrating a configuration of a wavelength monitoring circuit according to a first embodiment of the present disclosure. In a wavelength monitoring circuit 101, an input optical signal 111 to be monitored for a wavelength is input to an input port 112, and the output light beams from three output ports 113a, 113b, and 113c are converted into electrical signals (current values) by the photoelectric conversion elements (PD) 109a, 109b, and 109c, respectively. The optical signal input to the input port 112 is split by the light bifurcation circuit 102, and one of the output optical signals of the light bifurcation circuit 102 is further split by the light bifurcation circuit 103. One of the output optical signals of the light bifurcation circuit 103 is output from the first output port 113a. The other one of the output optical signals of the light bifurcation circuit 102 and the other of the output optical signals of the light bifurcation circuit 103 are input to the optical delay unit 104. The optical delay unit 104 has two waveguides 110a and 110b with different optical path lengths, and outputs an optical signal to each waveguide with a delay time difference.

One of the optical signals from the optical delay unit 104 is split by a light bifurcation circuit 105 that outputs optical signals having the same phase. Another one of the optical signals from the optical delay unit 104 is split by a light bifurcation circuit 106 that outputs optical signals having a phase difference of 90 degrees. Optical signals from the light bifurcation circuits 105 and 106 pass through a waveguide group 107 including four waveguides of the same length, and are multiplexed and interfere with each other in the first light multiplexing circuit 108a and the second light multiplexing circuit 108b. The interference light from the two light multiplexing circuits 108a and 108b is output from the second output port 113b and the third output port 113c, respectively.

Optical signals from the light bifurcation circuits 105 and 106 are distributed to the two light multiplexing circuits 108a and 108b by the four waveguides in the waveguide group 107 as follows. The optical signal input to the first light multiplexing circuit 108a is one of the outputs of the light bifurcation circuit 105 that outputs optical signals having the same phase, and one of the outputs of the light bifurcation circuit 106 that outputs optical signals having a phase difference of 90 degrees. The optical signal input to the second light multiplexing circuit 108b is the other of the outputs of the light bifurcation circuit 105 that outputs optical signals having the same phase, and the other of the outputs of the light bifurcation circuit 106 that outputs optical signals having a phase difference of 90 degrees.

Optical signals which are respectively output from the first output port 113a, the second output port 113b, and the third output port 113c are converted into electrical signals (current values) in the PD 109a, the PD 109b, and the PD 109c, respectively.

The light bifurcation circuit 105 that outputs the optical signals having the same phase can be, for example, a light splitter constituted by a Y-branch waveguide. The light bifurcation circuit 106 that outputs optical signals having a phase difference of 90 degrees can be, for example, a directional coupler or an MMI coupler.

The electrical signals (current values Id1 to Id3) obtained from the PD 109a, the PD 109b, and the PD 109c are expressed as values obtained by multiplying the "transmittance of the wavelength monitoring circuit"×"light intensity of the input optical signal" by a constant coefficient, respectively.

Id1="transmittance between input port and first output port"×"input optical signal intensity"×k1

Id2="transmittance between input port and second output port"×"input optical signal intensity"×k2

Id3="transmittance between input port and third output port"×"input optical signal intensity"×k3

Hereinafter, the electrical signal obtained from the PD is described as a current value from a current source corresponding to a level of the detected optical signal. Note that, depending on the detection mechanism of the PD, the electrical signal obtained from the PD may be an output of a voltage value from the voltage source. Here, the transmittance between the input port 112 and the first output port 113a of the wavelength monitoring circuit 101 can be regarded as a constant value independent of a wavelength. Only two light bifurcation circuits 102 and 103 are included between the input port 112 and the first output port 113a, and the optical signals do not pass through the optical delay unit 104. Thus, the transmittance between the input port 112 and the first output port 113a is not in principle wavelength-dependent, and may be regarded as a constant value in the range of the band of the optical communication wavelength.

Here, when, by the "electrical signal Id2 obtained from the PD 109b"÷"electrical signal Id1 obtained from the PD 109a", the ratio of both is calculated at a certain wavelength, the "light intensity of the input optical signal" information is canceled out, and a value r2 proportional to only "transmittance between the input port and the second output port" is obtained. The wavelength characteristic of the value r2 is a periodic filter characteristic as described below, and r2 is a value uniquely determined when the wavelength of the input signal light is determined. Thus, the ratio r2 of the electrical signal (current value) for each wavelength (frequency) of the optical signal is measured and a correspondence table is created in advance, and when the correspondence table is referred to, the wavelength of the input optical signal can be obtained from a value of the ratio r2 of the observed electrical signal (current value).

Similarly, when, by the "electrical signal Id3 obtained from the PD 109c"÷"electrical signal Id1 obtained from the PD 109a", the ratio of both is calculated at a certain wavelength, the "light intensity of the input optical signal" information is canceled out, and a value r3 proportional to only "transmittance between the input port and the third output port" is obtained. With respect to the value r3, the ratio r3 of the electrical signal (current value) for each wavelength (frequency) of the optical signal is measured and a correspondence table is created in advance, and when the correspondence table is referred to, the wavelength of the input optical signal can be known with high accuracy from the value of the ratio r3 of the observed electrical signal (current value).

As described above, the wavelength monitoring circuit 101 of the present disclosure includes an optical delay unit 104, a light bifurcation circuit 105 that outputs optical signals having the same phase, and a light bifurcation circuit 106 that outputs optical signals having a phase difference of 90 degrees, and configures the MZI throughout the wavelength monitoring circuit. Thus, the "transmittance between the input port 112 and the second output port 113b" and the "transmittance between the input port 112 and the third output port 113c" have the same periodic wavelength-dependent characteristic, and are offset by ¼ of one period.

In other words, when the transmittance of one of the output ports 113b and 113c is located at a peak or a bottom, the transmittance of the other output port is not located at either the peak or the bottom. Further, because the reverse is established, the wavelength monitoring circuit 101 can obtain the wavelength of the optical signal 111 input to the wavelength monitoring circuit 101 regardless of the wavelength of the optical signal, by selecting either an appropriate ratio r2 or r3 of the electrical signal (current value) for each wavelength of the optical signal.

The correspondence table between the above-described wavelengths and r2, r3 may be stored as correspondence relationship information in the memory or the like of the optical signal processing apparatus provided with the wavelength monitoring circuit. It is only required that the optical signal the wavelength of which is known beforehand is input to each wavelength monitoring circuit to be applied, r2 and r3 are obtained by measuring the level of electrical signal from each PD, and the correspondence relationship is stored in a memory. The wavelength monitoring circuit of the present disclosure can be widely applied in combination with various types of optical signal processing apparatuses. Thus, the wavelength monitoring circuit is described as not including a CPU or the like that operates to control the wavelength determination by using the memory and the correspondence relationship information. However, it should also be noted that a wavelength monitoring apparatus and a wavelength monitoring system can be implemented as an integrated configuration including the wavelength monitoring circuit, a memory and a CPU.

Hereinafter, a more specific configuration example of the wavelength monitoring circuit according to the present embodiment will be described. The ratio of splitting/multiplexing is 50:50 for all of the light bifurcation circuit 102, the light bifurcation circuit 103, the light bifurcation circuit 105 that outputs optical signals having the same phase, the light bifurcation circuit 106 that outputs optical signals having a phase difference of 90 degrees, and the light multiplexing circuits 108a and 108b. In this case, r2 is determined from the "electrical signal obtained from the PD 109b"÷ "electrical signal obtained from the PD 109a" (second output Id2/first output Id1), and then the wavelength dependence is plotted as described in FIG. 5. Similarly, r3 is determined from the "electrical signal obtained from the PD 109c"÷"electrical signal obtained from the PD 109a" (third output Id3/first output Id1), and then the wavelength dependence is plotted.

Figure 5:
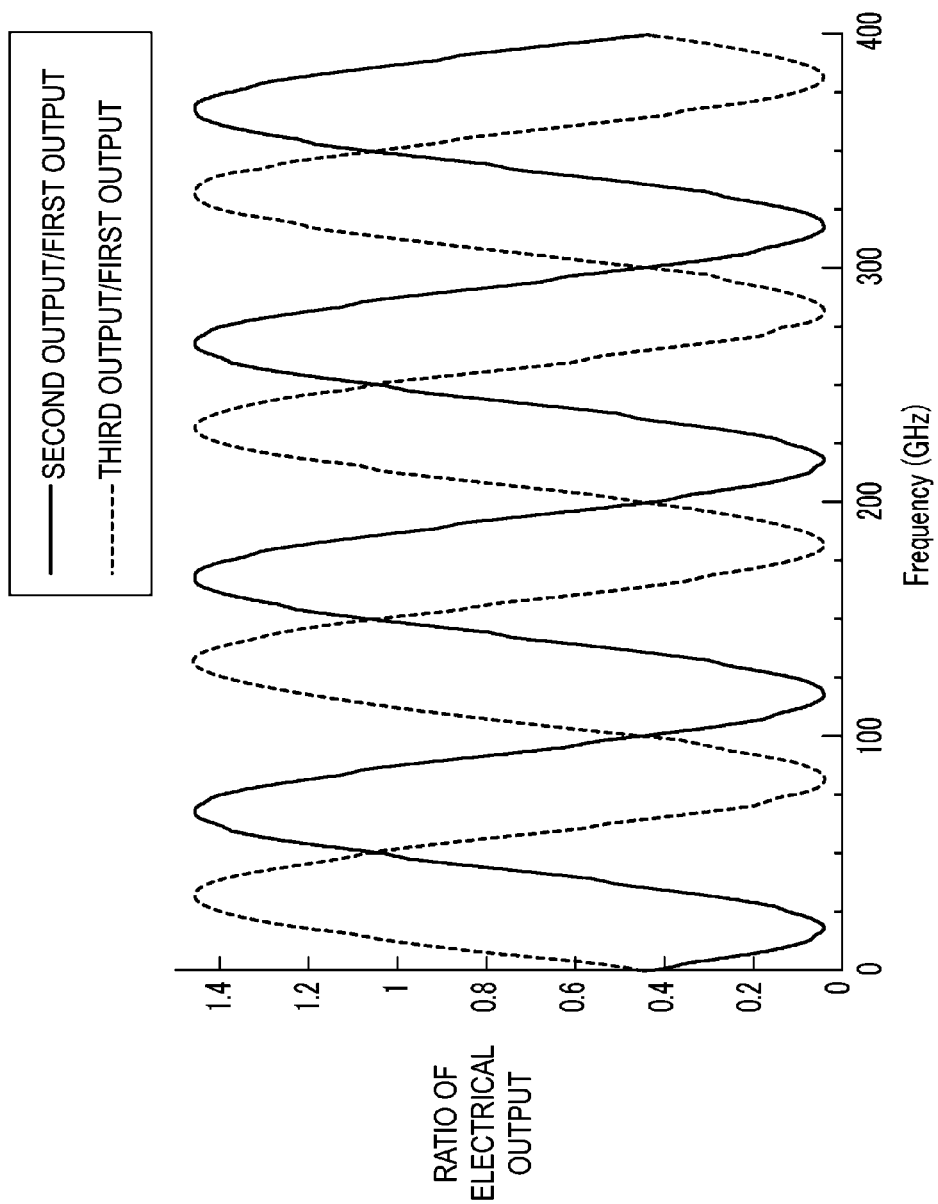
FIG. 5 is a diagram illustrating a wavelength monitoring curve of the wavelength monitoring circuit according to the first embodiment.

FIG. 5 is a diagram illustrating a wavelength monitoring curve of the wavelength monitoring circuit according to the first embodiment. The ratios r2 and r3 obtained respectively by dividing two electrical signals from the output ports 113b and 113c by the electrical signal of the output port 113a are illustrated. The two curves plotted in FIG. 5 have the same periodic characteristics, and their characteristics are offset each other by ¼ of one period. FIG. 5 illustrates a case where the wavelength-dependent repetition period is 100 GHz is illustrated, and the repetition period coincides with the reciprocal of the delay time difference (10 ps) given by the optical delay unit 104. By changing the delay time difference given by the optical delay unit 104, the repetition period can be set to a different value.

Figure 7:
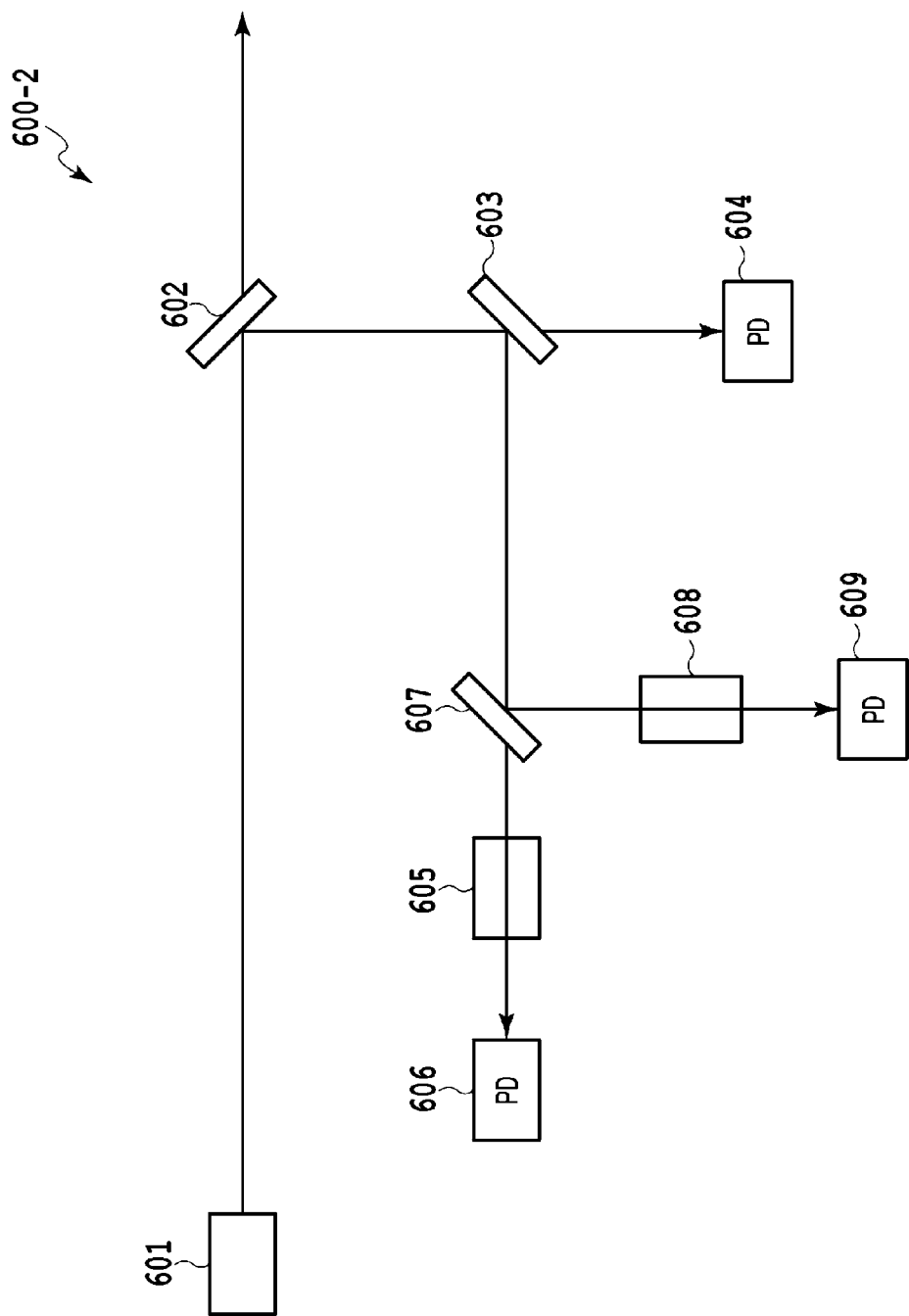
FIG. 7 is a diagram illustrating a configuration of an improved wavelength monitoring circuit according to the related art.

In a case where the filter circuit of FIG. 7, achieved by the PLC as described above, is applied to a decoder or the like of the phase modulation signal of the optical transceiver, the MZI in the wavelength monitoring circuit operates in a fully balanced configuration and interference conditions. The minimum value of the bottom of the transmission characteristic is approximately 0%, and the level of the electrical signal near the bottom also significantly decreases, which causes a problem of a deterioration in the detection accuracy of the wavelength and weakness to the optical noise signal.

Figure 8:
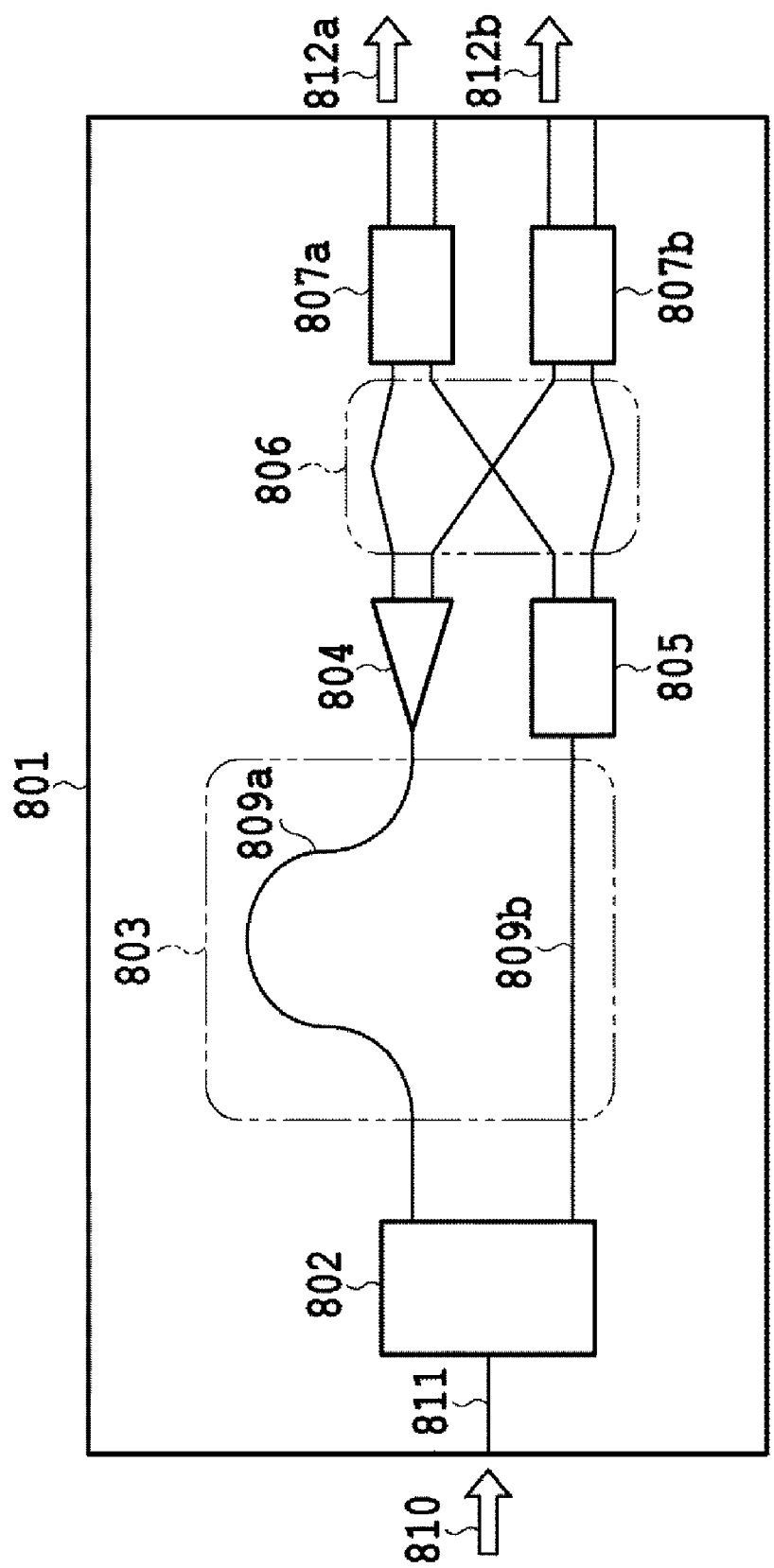
FIG. 8 is a diagram illustrating a configuration in which a portion of the wavelength monitoring circuit is produced by PLC.

In the wavelength monitoring circuit 101 of the present embodiment, in addition to the configuration in the related art illustrated in FIG. 8, an additional light bifurcation circuit 103 for further splitting the input optical signal 111 is provided. Thus, the levels of the optical signals input to the two waveguides 110a, 110b of the optical delay unit 104 are different from each other. As a result, the intensities of the two optical signals reaching each of the first light multiplexing circuit 108a and the second light multiplexing circuit 108b are different from each other. Because the two input light levels to the light multiplexing circuit 108a are different and the two input light levels to the light multiplexing circuit 108b are different, the MZI operates in a state of losing balance, and complete extinction does not occur in the interference light output. Thus, the bottom level of the transmission characteristic is raised, and the minimum value of the two curves plotting the ratios from the output ports 113b and 113c is not 0, but the value is approximately 3%. In the wavelength monitoring circuit of the present embodiment, by raising the level of the electrical signal near the bottom, a problem of a deterioration in the detection accuracy of the wavelength and weakness to the optical noise signal can be avoided.

Compared with the filter circuit in the related art, by a simple change of adding the light bifurcation circuit 103, an "output proportional to only the light intensity of the input optical signal" corresponding to the first output port 113a is obtained, and an effect for improving the resistance to the optical noise signal can be easily obtained. Further, to improve the resistance to the optical noise signal, the splitting/multiplexing ratio for one or a plurality of the light bifurcation circuit 102, the light bifurcation circuit 103, and the light multiplexing circuits 108a and 108b can be offset from 50:50.

Figure 6:
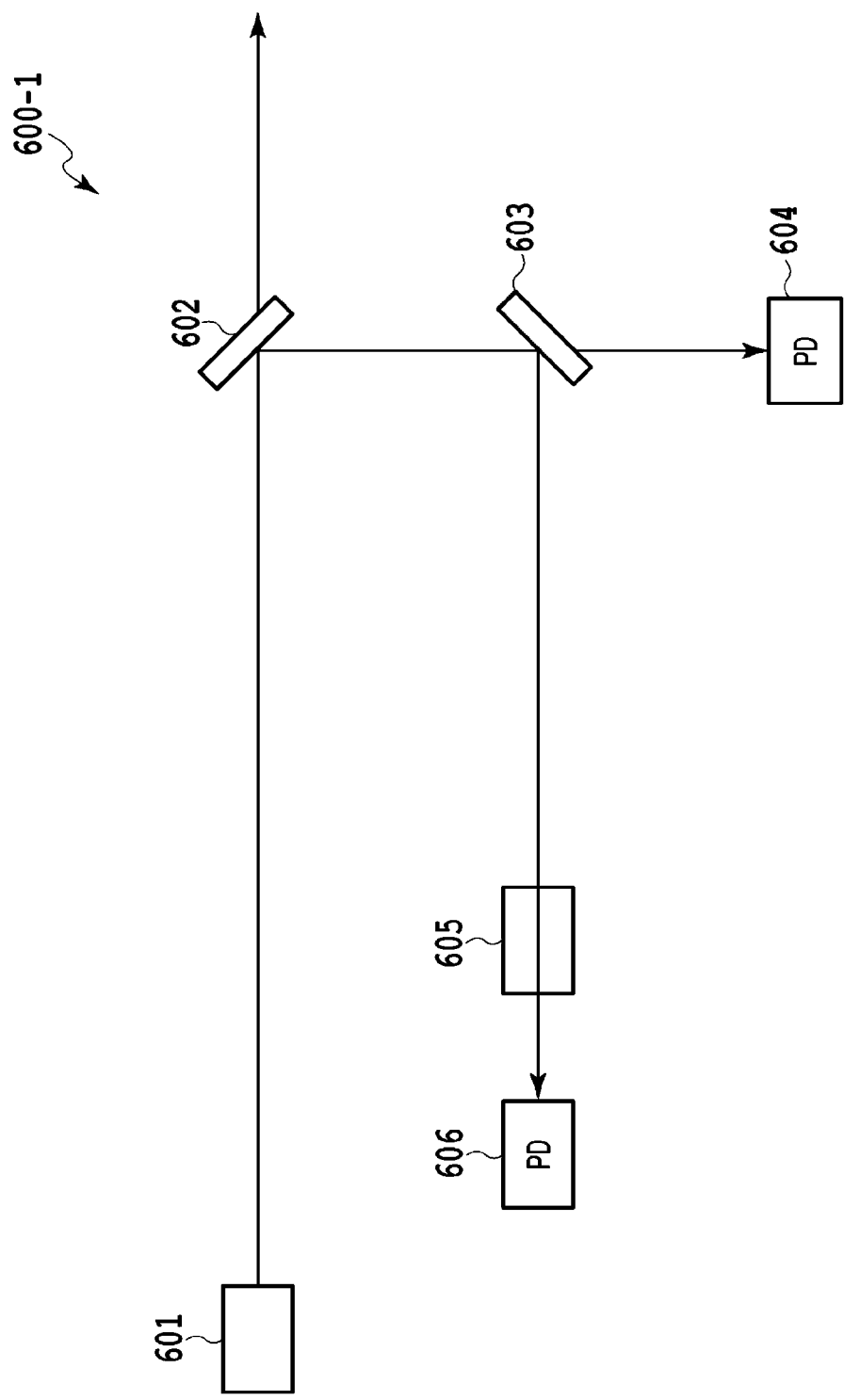
FIG. 6 is a diagram illustrating a conceptual configuration of a wavelength monitoring circuit in the related art.

The wavelength monitoring circuit 101 of the present embodiment may also be understood that a light bifurcation circuit at the input top stage is replaced with a light trifurcation circuit that splits a signal into three signals substantially unequally. Further, by forming the wavelength monitoring circuit 101 as a PLC on the same substrate, it is not susceptible to environmental changes, and it is not necessary to adjust the arrangement between components required in the configuration of FIGS. 6 and 7, and a favorable performance can be easily obtained.

As described above, the wavelength monitoring circuit of the present disclosure allows for wavelength monitoring while easily improving the resistance to noise, by simply adding a light split circuit to a filter circuit in the related art.

Second Embodiment

Figure 2:
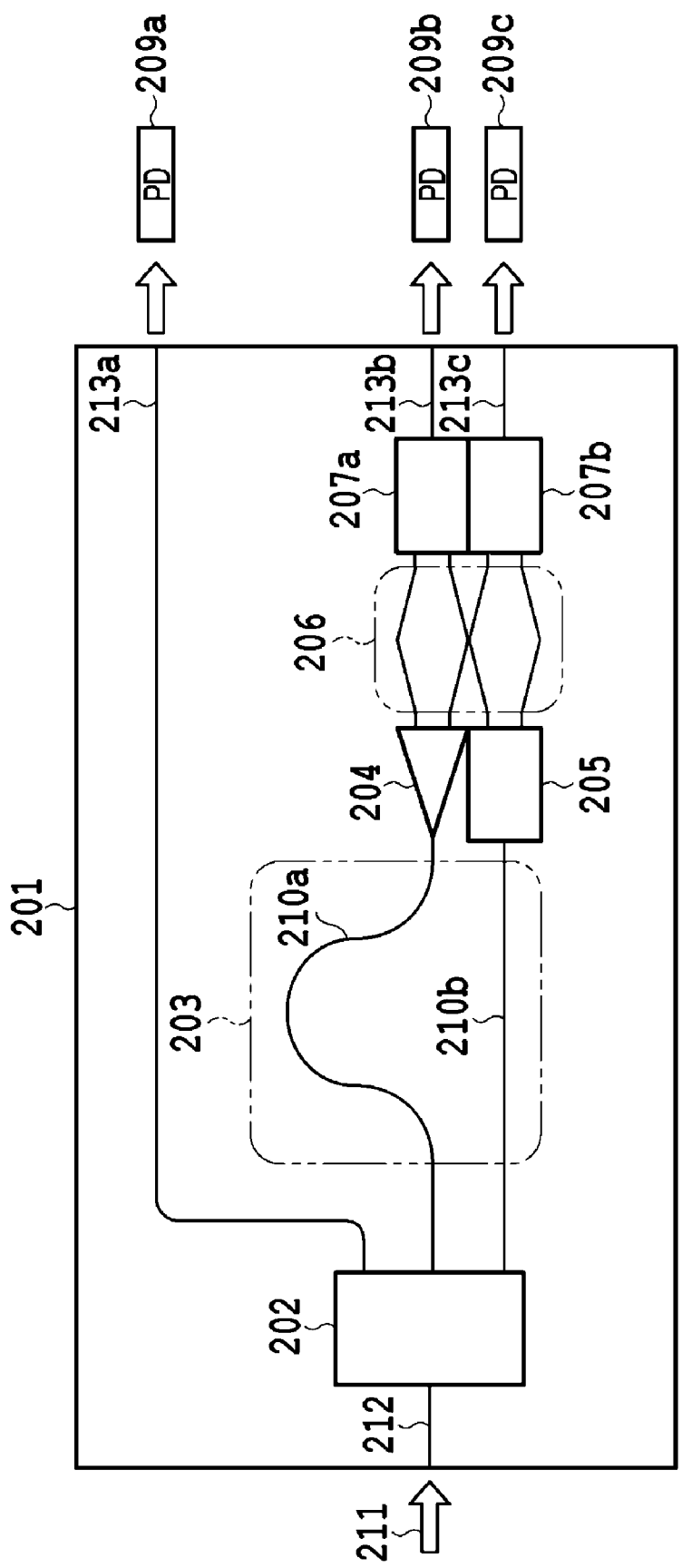
FIG. 2 is a diagram illustrating a configuration of a wavelength monitoring circuit according to a second embodiment of the present disclosure.

FIG. 2 is a diagram illustrating a configuration of a wavelength monitoring circuit according to a second embodiment of the present disclosure. In a wavelength monitoring circuit 201, an input optical signal 211 to be monitored for the wavelength is input to an input port 212, and the output light beams from three output ports 213a, 213b, and 213c are converted into electrical signals (current values) by the photoelectric conversion elements (PD) 209a, 209b, and 209c, respectively. The optical signal input to the input port 212 is split by the light trifurcation circuit 202, and the first output optical signal of the light trifurcation circuit 202 is output from the first output port 213a. The second output optical signal and the third output optical signal of the light trifurcation circuit 202 are input to the optical delay unit 203. The optical delay unit 203 has two waveguides 210a and 210b with different optical path lengths, and outputs an optical signal to each waveguide with a delay time difference.

One of the optical signals from the optical delay unit 203 is split by a light bifurcation circuit 204 that outputs optical signals having the same phase. The other of the optical signals from the optical delay unit 203 is split by a light bifurcation circuit 205 that outputs optical signals having a phase difference of 90 degrees. Optical signals from the light bifurcation circuits 204 and 205 pass through a waveguide group 206 including four waveguides of the same length, and are multiplexed and interfere with each other in the first light multiplexing circuit 207a and the second light multiplexing circuit 207b. The interference light from the two light multiplexing circuits 207a and 207b are output from the second output port 213b and the third output port 213c, respectively.

Optical signals from the light bifurcation circuits 204 and 205 are distributed to the two light multiplexing circuits 207a and 207b by the four waveguides of the same length in the waveguide group 206 as follows. The optical signal input to the first light multiplexing circuit 207a is one of the outputs of the light bifurcation circuit 204 that outputs optical signals having the same phase, and one of the outputs of the light bifurcation circuit 205 that outputs optical signals having a phase difference of 90 degrees. The optical signal input to the second light multiplexing circuit 207b is the other of the outputs of the light bifurcation circuit 204 that outputs the optical signals having the same phase and the other of the outputs of the light bifurcation circuit 205 that outputs the optical signals having a phase difference of 90 degrees.

Optical signals which are respectively output from the first output port 213a, the second output port 213b, and the third output port 213c are converted into electrical signals (current values) in the PD 209a, the PD 209b, and the PD 209c, respectively.

The light bifurcation circuit 204 that outputs an optical signal having the same phase can be a light splitter constituted by, for example, a Y-branch waveguide. The light bifurcation circuit 205 that outputs optical signals having a phase difference of 90 degrees can be, for example, a directional coupler or an MMI coupler.

Similar to the first embodiment, the electrical signals (current values Id1 to Id3) obtained from the PD 208a, the PD 208b, and the PD 208c are expressed as values obtained by multiplying the "transmittance of the wavelength monitoring circuit"×"light intensity of the input optical signal" by a constant coefficient, respectively.

Id1="transmittance between input port and first output port"×"input optical signal intensity"×k1
Id2="transmittance between input port and second output port"×"input optical signal intensity"×k2
Id3="transmittance between input port and third output port"×"input optical signal intensity"×k3

The transmittance between the input port 212 and the first output port 213a of the wavelength monitoring circuit 201 can be regarded as a constant value independent of a wavelength. Between the input port 212 and the first output port 213a, only the light bifurcation circuit 202 is included, and signals do not pass through the optical delay unit 302. Thus, the transmittance between the input port 212 and the first output port 213a is not in principle wavelength-dependent, and may be regarded as a constant value in the range of the band of the optical communication wavelength.

Here, when, by the "electrical signal Id2 obtained from the PD 208b"÷"electrical signal Id1 obtained from the PD 208a", the ratio of both is calculated at a certain wavelength, the "light intensity of the input optical signal" information is canceled out, and a value r2 proportional to only "transmittance between the input port and the second output port" is obtained. The wavelength characteristic of the value r2 is a periodic filter characteristic as described below, and r2 is a value uniquely determined when the wavelength of the input signal light is determined. Thus, the ratio r2 of the electrical signal (current value) for each wavelength (frequency) of the optical signal is measured and a correspondence table is created in advance, and when the correspondence table is referred to, the wavelength of the input optical signal can be obtained from a value of the ratio r2 of the observed electrical signal (current value).

Similarly, when, by the "electrical signal Id3 obtained from the PD 208c"÷"electrical signal Id1 obtained from the PD 109a" the ratio of both is calculated at a certain wavelength, a value r3 proportional to only the "transmittance between the input port and the third output port" is obtained. With respect to the value r3, the ratio r3 of the electrical signal (current value) for each wavelength (frequency) of the optical signal is measured and a correspondence table is created in advance, and when the correspondence table is referred to, the wavelength of the input optical signal can be known with high accuracy from the value of the ratio r3 of the observed electrical signal (current value).

As described above, the wavelength monitoring circuit 201 of the present disclosure includes an optical delay unit 203, a light bifurcation circuit 204 that outputs optical signals having the same phase, and a light bifurcation circuit 205 that outputs optical signals having a phase difference of 90 degrees, and configures the MZI throughout the wavelength monitoring circuit. Thus, the "transmittance between the input port 212 and the second output port 213b" and the "transmittance between the input port 212 and the third output port 213c" have the same periodic wavelength-dependent characteristic, and are offset each other by ¼ of one period. In other words, when the transmittance of one of the output ports 213b and 213c is located at a peak or a bottom, the transmittance of the other output port is not located at either the peak or the bottom. Further, because the reverse is established, the wavelength monitoring circuit 201 can obtain the wavelength of the optical signal 211 input to the wavelength monitoring circuit 201 regardless of the wavelength of the optical signal, by selecting either an appropriate ratio r2 or r3 of the electrical signal (current value) for each wavelength of the optical signal.

Hereinafter, a more specific configuration example of the wavelength monitoring circuit according to the second embodiment will be described. The ratio of splitting/multiplexing is 50:50 for all of the light bifurcation circuit 204 that outputs optical signals having the same phase, the light bifurcation circuit 205 that outputs optical signals having a phase difference of 90 degrees, and the light multiplexing circuits 207a and 207b. The splitting ratio of the light trifurcation circuit 202 is assumed to be a first output port:second output port:third output port=1:2:1. It is quite possible to design the splitting ratio of the light trifurcation circuit 202 to 1:2:1 with good symmetry. In this case, r2 is determined from the "electrical signal obtained from the PD 208b"÷"electrical signal obtained from the PD 208a" (second output Id2/first output Id1), and then the wavelength dependence is plotted. Similarly, r3 is determined from the "electrical signal obtained from the PD 208c"÷"electrical signal obtained from the PD 208a" (third output Id3/first output Id1), and then the wavelength dependence is plotted. The curves of the two transmission characteristics for the wavelength monitoring, in the wavelength monitoring circuit of the second embodiment, are consistent with the case of the first embodiment illustrated in FIG. 5.

Similar to the first embodiment, in the example of transmission characteristics illustrated in FIG. 5, a case where the wavelength-dependent repetition period is 100 GHz is illustrated, and the repetition period coincides with the reciprocal of the delay time difference (10 ps) given by the optical delay unit 203. By changing the delay time difference given by the optical delay unit 203, the repetition period can be set to a different value. The curves of the two transmission characteristics plotted in FIG. 5 have the same periodic characteristics, and their characteristics are offset each other by ¼ of the one period.

In the wavelength monitoring circuit 201 of the present embodiment, in comparison to the configuration in the related art illustrated in FIG. 8, a light trifurcation circuit 202 is provided instead of the light bifurcation circuit, and a splitting ratio to the optical delay unit 203 is set to 2:1. Thus, the levels of the optical signals input to the two waveguides 210a, 210b of the optical delay unit 203 are different from each other. As a result, the intensities of the two optical signals reaching each of the first light multiplexing circuit 207a and the second light multiplexing circuit 207b are different from each other. Because the two input light levels to the light multiplexing circuit 207a are different and the two input light levels to the light multiplexing circuit 207b are different, the MZI operates in a state of losing balance, and complete extinction does not occur in the interference light output. Thus, the bottom level of the transmission characteristic is raised, and the minimum value of the two curves plotting the ratios from the output ports 213b and 213c is not 0, but the value is approximately 3%. In the wavelength monitoring circuit of the present embodiment, by raising the level of the electrical signal near the bottom, a problem of a deterioration in the detection accuracy of the wavelength and weakness to the optical noise signal can be avoided.

Compared with a filter circuit which is applied to the decoder or the like of the phase modulation signal of the optical transceiver achieved by the PLC, by simply changing the light bifurcation circuit to the light trifurcation circuit 202, an "output proportional to only the light intensity of the input optical signal" corresponding to the first output port 213a is obtained, and an effect for improving the resistance to the optical noise signal can be easily obtained. Further, to improve the resistance to the optical noise signal, the splitting ratio of the light multiplexing circuits 207a and 207b may be offset from 50:50, or the splitting ratio of the light trifurcation circuit 202 may be offset from the first output:the second output:the third output=1:2:1. It should be noted that when the splitting ratio of the light trifurcation circuit 202 is the second output:third output=1:1, the levels of the two optical signals to the optical delay unit 203 are the same, and the MZI operates in a fully balanced state. Therefore, the filter characteristics of the wavelength monitoring circuit are substantially 0% of the minimum transmittance as in the related art. In the wavelength monitoring circuit of the present embodiment, it is important to use the splitting ratio of the light trifurcation circuit 202 in a configuration or operating state in which the balance is lost in the MZI within the wavelength monitoring circuit 201. By forming the wavelength monitoring circuit 201 of the present embodiment as a PLC on the same substrate, it is not susceptible to environmental changes, and it is unnecessary to adjust the arrangement between components required in the configuration of FIGS. 6 and 7, and a favorable performance can be easily obtained.

As described above, with the wavelength monitoring circuit of the present disclosure, by simply changing the configuration of the light split circuit in the top stage in the filter circuit in the related art, it is possible to accurately monitor wavelengths while easily improving the resistance to noise.

The wavelength monitoring circuits of the first and second embodiments described above are all common in that the "output proportional to only the light intensity of the input optical signal" corresponding to the optical signals from the first output ports 113a and 213a are extracted from a portion corresponding to the light trifurcation circuit (102+103 and 202) of the input light at the top stage of the circuit. The MZIs in the wavelength monitoring circuits 101 and 201 are used in a configuration or an operation state in which balance as an interference circuit is lost by inputting the optical signals to the optical delay units 104 and 203 at a splitting ratio in the light trifurcation circuit, which is not equal (1:1). This unbalanced state is due to the provision of different levels of optical signals to the optical delay unit of the MZI Consequently, the present disclosure includes an input light split circuit, an optical delay unit (104, 203), a light split stage, and a light multiplexing stage. The input light split circuit is an input light split circuit (102, 103, 202) that splits an input optical signal into three signals, and outputs first split light as a first light output. The optical delay unit (104, 203) provides a time delay difference to the second split light and the third split light from the input light split circuit. The light split stage includes a first light split unit (105, 204) and a second light split unit (106, 205). The first light split unit (105, 204) further splits one of the optical signals output from the optical delay unit into optical signals having the same phase. The second light split unit (106, 205) further splits the other optical signal output from the optical delay unit into optical signals having a phase difference of 90 degrees. The light multiplexing stage has a first light multiplexing circuit (108a, 207a) and a second light multiplexing circuit (108b, 207b), and is connected to the light split stage by a waveguide (107, 206) of the same length. The first light multiplexing circuit (108a, 207a) is configured to obtain a second light output of interference light, by multiplexing one of the split light beams from the first light split unit and one of the split light beams from the second light split unit, and the second light multiplexing circuit (108b, 207b) is configured to obtain a third light output of the interference light, by multiplexing the other of the split light beams from the first light split unit and the other of the split light beams from the second light split unit. The present disclosure can be implemented as a wavelength monitoring circuit configured to determine the wavelength of the input optical signal, based on an electrical output obtained from the second light output and an electrical output obtained from the first light output, or an electrical output obtained from the third light output and an electrical output obtained from the first light output.

Third Embodiment

Figure 3:
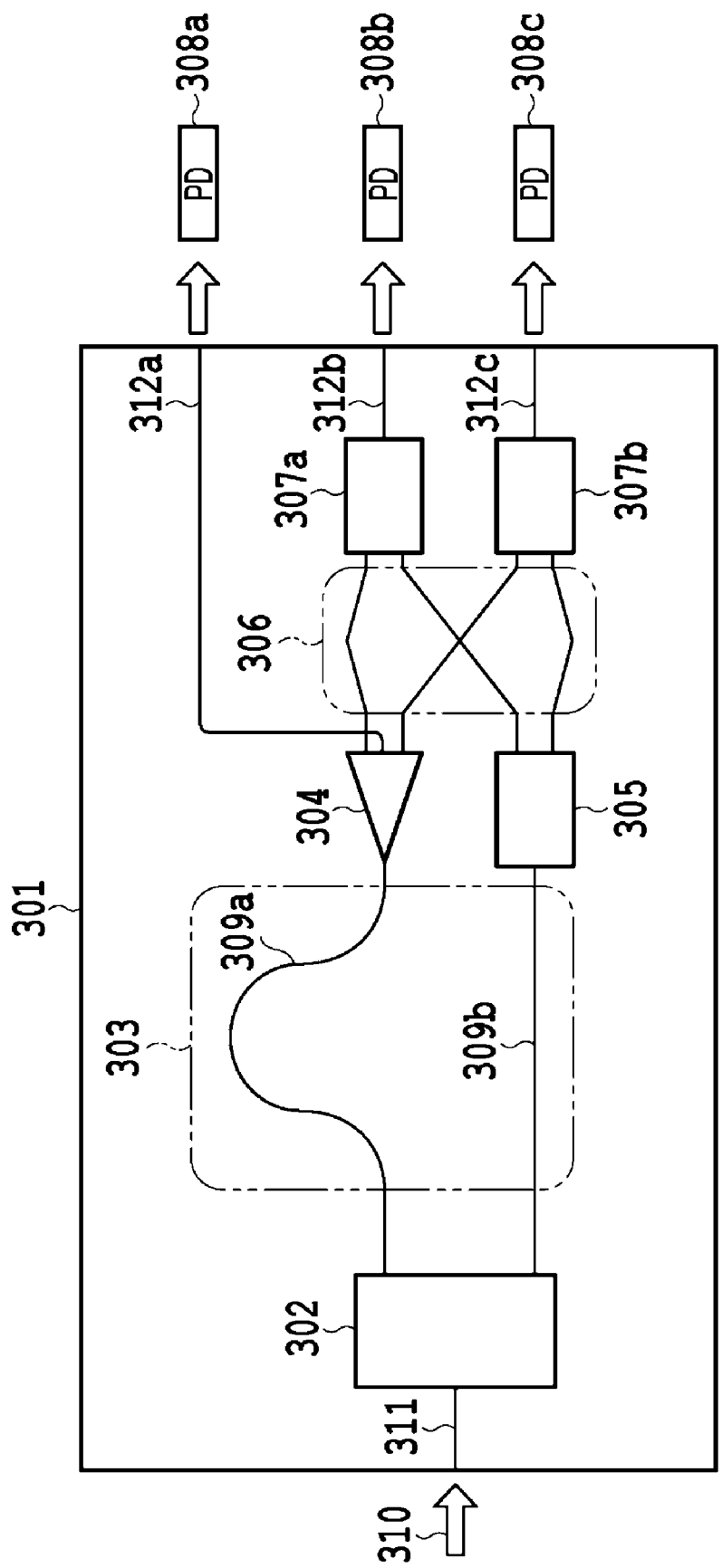
FIG. 3 is a diagram illustrating a configuration of a wavelength monitoring circuit according to a third embodiment of the present disclosure.

FIG. 3 is a diagram illustrating a configuration of a wavelength monitoring circuit according to a third embodiment of the present disclosure. In a wavelength monitoring circuit 301, an input optical signal 310 to be monitored for the wavelength is input to an input port 311, and the output light beams from three output ports 312a, 312b, and 312c are converted into electrical signals (current values) by the photoelectric conversion elements (PD) 308a, 308b, and 308c, respectively.

The optical signal input to the input port 311 is split by the light bifurcation circuit 302, and the split light beams are input to the optical delay unit 303. The optical delay unit 303 has two waveguides 309a and 309b with different optical path lengths, and outputs an optical signal to each waveguide with a delay time difference.

One of the optical signals from the optical delay unit 303 is split by a light trifurcation circuit 304 that outputs first and third optical signals (split light) having the same phase. The other of the optical signals from the optical delay unit 303 is split by a light bifurcation circuit 305 that outputs optical signals having a phase difference of 90 degrees. The second output optical signal (split light) of the light trifurcation circuit 304 is output from the first output port 312a. Optical signals from the light trifurcation circuit 304 and the light bifurcation circuits 305 pass through a waveguide group 306 including four waveguides of the same length, and are multiplexed and interfere with each other in the first light multiplexing circuit 307a and the second light multiplexing circuit 307b. The interference light from the two light multiplexing circuits 307a and 307b is output from the second output port 312b and the third output port 312c, respectively.

Optical signals from the light trifurcation circuit 304 and the light bifurcation circuit 305 are distributed to the two light multiplexing circuits 307a and 307b by the four waveguides of the same length in the waveguide group 306 as follows. The optical signal input to the first light multiplexing circuit 307a is one of the outputs of the first and third optical signals having the same phase, which are output from the light trifurcation circuit 304, and one of the outputs of the light bifurcation circuit 305 that outputs optical signals having a phase difference of 90 degrees. The optical signal input to the second light multiplexing circuit 307b is the other of the outputs of the first and third optical signals, which are output from the light trifurcation circuit 304, and the other of the outputs of the light bifurcation circuit 305 that outputs optical signals having a phase difference of 90 degrees. Optical signals which are respectively output from the first output port 312a, the second output port 312b, and the third output port 312c are converted into electrical signals (current values) in the PD 308a, the PD 308b, and the PD 308c, respectively.

The light trifurcation circuit 304 that outputs the first and third optical signals having the same phase can be, for example, an optical circuit having ψ-shaped three-branched waveguides. The light bifurcation circuit 305 that outputs optical signals having a phase difference of 90 degrees can be, for example, a directional coupler or an MMI coupler.

Similar to each of the embodiments described above, the electrical signals (current values Id1 to Id3) obtained from the PD 308a, the PD 308b, and the PD 308c are expressed as values obtained by multiplying the "transmittance of the wavelength monitoring circuit"×"light intensity of the input optical signal" by a constant coefficient, respectively.

Id1="transmittance between input port and first output port"×"input optical signal intensity"×k1
Id2="transmittance between input port and second output port"×"input optical signal intensity"×k2
Id3="transmittance between input port and third output port"×"input optical signal intensity"×k3

Hereinafter, the electrical signal obtained from the PD is described as a current value from a current source corresponding to a level of the detected optical signal. Here, the transmittance between the input port 311 and the first output port 313a of the wavelength monitoring circuit 301 can be regarded as a constant value independent of a wavelength. Between the input port 311 and the first output port 312a, only the light bifurcation circuit 302, the light trifurcation circuit 304, and one waveguide 309a of the optical delay unit 303 are included. Thus, the transmittance between the input port 311 and the first output port 312a is not in principle wavelength-dependent, and may be regarded as a constant value in the range of the band of the optical communication wavelength.

Here, when, by the "electrical signal Id2 obtained from the PD 308b"÷ "electrical signal Id1 obtained from the PD 308", the ratio of both is calculated at a certain wavelength, the "light intensity of the input optical signal" information is canceled out, and a value r2 proportional to only "transmittance between the input port and the second output port" is obtained. The wavelength characteristic of the value r2 is a periodic filter characteristic as described below, and r2 is a value uniquely determined when the wavelength of the input signal light is determined. Thus, the ratio r2 of the electrical signal (current value) for each wavelength (frequency) of the optical signal is measured and a correspondence table is created in advance, and when the correspondence table is referred to, the wavelength of the input optical signal can be obtained from a value of the ratio r2 of the observed electrical signal (current value).

Similarly, when, by the "electrical signal Id3 obtained from the PD 308c"÷ "electrical signal Id1 obtained from the PD 308a", the ratio of both is calculated at a certain wavelength, the "light intensity of the input optical signal" information is canceled out, and a value r3 proportional to only "transmittance between the input port and the third output port" is obtained. With respect to the value r3, the ratio r3 of the electrical signal (current value) for each wavelength (frequency) of the optical signal is measured and a correspondence table is created in advance, and when the correspondence table is referred to, the wavelength of the input optical signal can be known with high accuracy from the value of the ratio r3 of the observed electrical signal (current value).

As described above, the wavelength monitoring circuit 301 of the present disclosure includes an optical delay unit 303, a light trifurcation circuit 304 that outputs first and third optical signals having the same phase, and a light bifurcation circuit 305 that outputs optical signals having a phase difference of 90 degrees, and configures the MZI throughout the wavelength monitoring circuit. Thus, the "transmittance between the input port 311 and the second output port 312b" and the "transmittance between the input port 311 and the third output port 312c" have the same periodic transmission characteristic, and are offset by ¼ of one period. In other words, when the transmittance of one of the two output ports 312b and 312c is located at a peak or a bottom, the transmittance of the other output port is not located at either the peak or the bottom. Further, because the reverse is established, the wavelength monitoring circuit 301 can obtain the wavelength of the optical signal 310 input to the wavelength monitoring circuit 301 regardless of the wavelength of the optical signal, by selecting either an appropriate ratio r2 or r3 of the electrical signal (current value) for each wavelength of the optical signal.

Hereinafter, a more specific configuration example of the wavelength monitoring circuit according to the present embodiment will be described. The ratio of splitting/multiplexing is 50:50 for all of the light bifurcation circuit 302, the light bifurcation circuit 305 that outputs optical signals having a phase difference of 90 degrees, and the light multiplexing circuits 307a and 307b. Further, the splitting ratio of the light trifurcation circuit 304 that outputs the first and third optical signals having the same phase is set to the first output:second output:third output=1:2:1. It is quite possible to design the splitting ratio of the light trifurcation circuit that outputs the first and third optical signals having the same phase to 1:2:1 with good symmetry around the second port. In this case, r2 is determined from the "electrical signal obtained from the PD 308b"÷ "electrical signal obtained from the PD 308a" (second output Id2/first output Id1), and then the wavelength dependence is plotted. Similarly, r3 is determined from the "electrical signal obtained from the PD 308c"÷ "electrical signal obtained from the PD 308a" (third output Id3/first output Id1), and then the wavelength dependence is plotted. The curves of the two transmission characteristics for the wavelength monitoring, in the wavelength monitoring circuit 301 of the third embodiment, are consistent with the case of the first embodiment illustrated in FIG. 5.

Similar to the first and second embodiments, in the example illustrated in FIG. 5, a case where the wavelength-dependent repetition period is 100 GHz is illustrated, and the repetition period coincides with the reciprocal of the delay time difference (10 ps) given by the optical delay unit 303. By changing the delay time difference given by the optical delay unit 303, the repetition period can be set to a different value. The two curves plotted in FIG. 5 have the same periodic characteristics, and their characteristics are offset each other by ¼ of one period.

The wavelength monitoring circuit 301 of the present embodiment includes, in comparison to the filter circuit in the related art, a light trifurcation circuit 304 that outputs first and third optical signals having the same phase, instead of a light bifurcation circuit that outputs the optical signal having the same phase in a stage in the middle of the circuit. The splitting ratio of the three outputs of the light trifurcation circuit 304 is 1:2:1, and the splitting ratio to the circuit 307a, 307b is set to 1:1. As a result, the intensities of the two optical signals reaching each of the first light multiplexing circuit 307a and the second light multiplexing circuit 307b are different from each other. Because the splitting ratio is 1:2:1, the first and third output optical signals of the light trifurcation circuit 304 are substantially ¼ of the optical signal level from the waveguide 309a. On the other hand, the level of each split light of the light bifurcation circuit 305 is substantially ½ of the optical signal level from the waveguide 309b. Thus, the two input light levels to the light multiplexing circuit 307a are ¼:½=1:2 and different from each other, and the two input light levels to the light multiplexing circuit 307b are also different. The MZI of the wavelength monitoring circuit 301 operates in a state of losing balance, and complete extinction does not occur in the interference light output. Thus, the bottom level of the transmission characteristic is raised, and the minimum value of the two curves plotting the ratios from the output ports 312b and 313c is not 0, but the value is approximately 3%. In the wavelength monitoring circuit of the present embodiment, by raising the level of the electrical signal near the bottom, a problem of a deterioration in the detection accuracy of the wavelength and weakness to the optical noise signal can be avoided.

Compared with a filter circuit which is applied to the decoder or the like of the phase modulation signal of the optical transceiver achieved by the PLC, by simply changing the light bifurcation circuit to the light trifurcation circuit 304, an "output proportional to only the light intensity of the input optical signal" corresponding to the first output port 312a is obtained, and an effect for improving the resistance to the optical noise signal can be easily obtained. Further, to improve the resistance to the optical noise signal, the splitting ratio of any of the light bifurcation circuit 302 and the light multiplexing circuits 307a and 307b can be offset from 50:50. Further, the splitting ratio of the light trifurcation circuit 304 that outputs the first and third optical signals having the same phase can be offset from the first output:second output:third output=1:2:1, while keeping the splitting ratio to the first and third outputs equal.

As long as the light trifurcation circuit 304 is utilized, the level of each split light is always less than ½, so that the MZI of the wavelength monitoring circuit 301 can always operate in a state of losing balance. By forming the wavelength monitoring circuit 301 of the present embodiment as a PLC on the same substrate, it is not susceptible to environmental changes, and it is unnecessary to adjust the arrangement between components required in the configuration of FIGS. 6 and 7, and a favorable performance can be easily obtained.

As described above, with the wavelength monitoring circuit of the present disclosure, in comparison to the filter circuit in the related art, wavelength monitoring with high accuracy is possible while easily improving the resistance to noise by simply changing the configuration of the light split circuit in a stage in the middle of the circuit.

Fourth Embodiment

Figure 4:
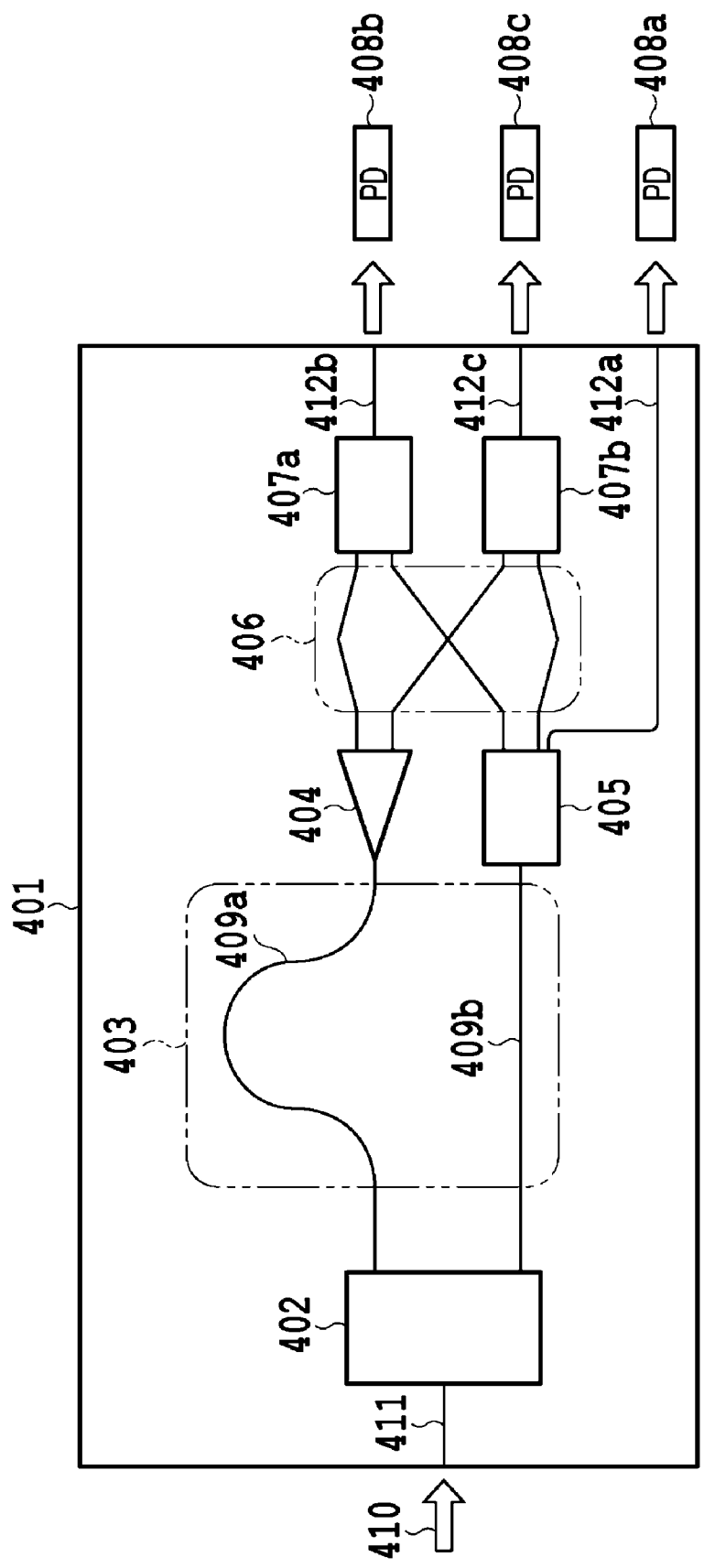
FIG. 4 is a diagram illustrating a configuration of a wavelength monitoring circuit according to a fourth embodiment of the present disclosure.

FIG. 4 is a diagram illustrating a configuration of a wavelength monitoring circuit according to a fourth embodiment of the present disclosure. In a wavelength monitoring circuit 401, an input optical signal 410 to be monitored for the wavelength is input to an input port 411, and the output light beams from three output ports 412a, 412b, and 412c are converted into electrical signals (current values) by the photoelectric conversion elements (PD) 408a, 408b, and 408c, respectively.

The optical signal input to the input port 411 is split by the light bifurcation circuit 402, and the split light beams are input to the optical delay unit 403. The optical delay unit 403 has two waveguides 409a and 409b with different optical path lengths, and outputs an optical signal to each waveguide with a delay time difference.

One of the optical signals from the optical delay unit 403 is split by a light bifurcation circuit 404 that outputs optical signals having the same phase. The other of the optical signals from the optical delay unit 403 is split by the light bifurcation circuit 405 that outputs first and second output optical signals having a phase difference of 90 degrees. The third output optical signal of the light trifurcation circuit 405 that outputs first and second output optical signals having a phase difference of 90 degrees is output from the first output port 412a.

Optical signals from the light bifurcation circuit 404 and the light trifurcation circuit 405 pass through a waveguide group 406 including four waveguides of the same length, and are multiplexed and interfere with each other in the first light multiplexing circuit 407a and the second light multiplexing circuit 407b. The interference light from the two light multiplexing circuits 407a and 407b is output from the second output port 412b and the third output port 412c, respectively.

Optical signals from the light bifurcation circuit 404 and the light trifurcation circuit 405 are distributed to the two light multiplexing circuits 407a and 407b by the four waveguides of the same length in the waveguide group 406 as follows. The optical signal input to the first light multiplexing circuit 407a is one of the outputs of the light bifurcation circuit 404 that outputs optical signals having the same phase and one of the outputs of the first and second output optical signals having a phase difference of 90 degrees, which are output from the light bifurcation circuit 405. Further, the optical signal input to the second light multiplexing circuit 407b is the other of the outputs of the light bifurcation circuit 404 that outputs optical signals having the same phase and the other of the outputs of the first and second output optical signals having a phase difference of 90 degrees, which are output from the light bifurcation circuit 405. Optical signals which are respectively output from the first output port 412a, the second output port 412b, and the third output port 412c are converted into electrical signals (current values) in the PD 408a, the PD 408b, and the PD 408c, respectively.

The light bifurcation circuit 405 that outputs first and second output optical signals having a phase difference of 90 degrees can be an optical circuit constituted by a waveguide that is three-branched into, for example, a w shape. The light bifurcation circuit 404 that outputs the optical signals having the same phase can be, for example, a light splitter constituted by a Y-branch waveguide.

Similar to each of the first to third embodiments described above, the electrical signals (current values) Id1 to Id3 obtained from the PD 408a, the PD 408b, and the PD 408c are expressed as values obtained by multiplying the "transmittance of the wavelength monitoring circuit"×"light intensity of the input optical signal" by a constant coefficient, respectively.

Id1="transmittance between input port and first output port"×"input optical signal intensity"×k1

Id2="transmittance between input port and second output port"×"input optical signal intensity"×k2

Id3="transmittance between input port and third output port"×"input optical signal intensity"×k3

Hereinafter, the electrical signal obtained from the PD is described as a current value from a current source corresponding to a level of the detected optical signal. Here, the transmittance between the input port 411 and the first output port 413a of the wavelength monitoring circuit 401 can be regarded as a constant value independent of a wavelength. Between the input port 411 and the first output port 412a, only the light bifurcation circuit 402, the light trifurcation circuit 405, and one waveguide 409b of the optical delay unit 403 are included. Thus, the transmittance between the input port 411 and the first output port 412a is not in principle wavelength-dependent, and may be regarded as a constant value in the range of the band of the optical communication wavelength.

Here, when, by the "electrical signal Id2 obtained from the PD 408b"÷ "electrical signal Id1 obtained from the PD 408", the ratio of both is calculated at a certain wavelength, the "light intensity of the input optical signal" information is canceled out, and a value r2 proportional to only "transmittance between the input port and the second output port" is obtained. The wavelength characteristic of the value r2 is a periodic filter characteristic as described below, and r2 is a value uniquely determined when the wavelength of the input signal light is determined. Thus, the ratio r2 of the electrical signal (current value) for each wavelength (frequency) of the optical signal is measured and a correspondence table is created in advance, and when the correspondence table is referred to, the wavelength of the input optical signal can be obtained from a value of the ratio r2 of the observed electrical signal (current value).

Similarly, when, by the "electrical signal Id3 obtained from the PD 408c"÷ "electrical signal Id1 obtained from the PD 408a", the ratio of both is calculated at a certain wavelength, the "light intensity of the input optical signal" information is canceled out, and a value r3 proportional to only "transmittance between the input port and the third output port" is obtained. With respect to the value r3, the ratio r3 of the electrical signal (current value) for each wavelength (frequency) of the optical signal is measured and a correspondence table is created in advance, and when the correspondence table is referred to, the wavelength of the input optical signal can be known with high accuracy from the value of the ratio r3 of the observed electrical signal (current value).

As described above, the wavelength monitoring circuit 401 of the present disclosure includes an optical delay unit 403, a light bifurcation circuit 404 that outputs optical signals having the same phase, and a light trifurcation circuit 405 that outputs first and second output optical signals having a phase difference of 90 degrees, and configures the MZI throughout the wavelength monitoring circuit. Thus, the "transmittance between the input port 411 and the second output port 412b" and the "transmittance between the input port 411 and the third output port 412c" have the same periodic transmittance characteristic, and are offset by ¼ of one period. In other words, when the transmittance of one of the two output ports 412b and 412c is located at a peak or a bottom, the transmittance of the other output port is not located at either the peak or the bottom. Further, because the reverse is established, the wavelength monitoring circuit 401 can obtain the wavelength of the optical signal 410 input to the wavelength monitoring circuit 401 regardless of the wavelength of the optical signal, by selecting either an appropriate ratio r2 or r3 of the electrical signal (current value) for each wavelength of the optical signal.

Hereinafter, a more specific configuration example will be described. The ratio of splitting/multiplexing is 50:50 for all of the light bifurcation circuit 402, the light bifurcation circuit 404 that outputs optical signals having the same phase, and the light multiplexing circuits 407a and 407b. Further, the splitting ratio of the light trifurcation circuit 405 that outputs first and second output optical signals having a phase difference of 90 degrees is set to first output port: second output port:third output port=1:1:1. It is quite possible to design the splitting ratio of the light trifurcation circuit 405 that outputs the first and second output optical signals having a phase difference of 90 degrees to 1:1:1 with good symmetry around the second port. In this case, r2 is determined from the "electrical signal obtained from the PD 408b"÷ "electrical signal obtained from the PD 408a" (second output Id2/first output Id1), and then the wavelength dependence is plotted. Similarly, r3 is determined from the "electrical signal obtained from the PD 408c"÷ "electrical signal obtained from the PD 408a" (third output Id3/first output Id1), and then the wavelength dependence is plotted. The curves of the two transmission characteristics for the wavelength monitoring, in the wavelength monitoring circuit 401 of the fourth embodiment, have also the same filter characteristics as that of the first embodiment illustrated in FIG. 5, except that the minimum value of the bottom portion is different from 1%.

Similar to the first through third embodiments, in the example illustrated in FIG. 5, a case where the wavelength-dependent repetition period is 100 GHz is illustrated, and the repetition period coincides with the reciprocal of the delay time difference (10 ps) given by the optical delay unit 403. By changing the delay time difference given by the optical delay unit 403, the repetition period can be set to a different value.

The wavelength monitoring circuit 401 of the present embodiment includes a light trifurcation circuit 405 that outputs first and second output optical signals having a phase difference of 90 degrees, instead of the light bifurcation circuit that outputs optical signals having a phase difference of 90 degrees, as compared to the filter circuit in the related art. The splitting ratio of the three outputs of the light trifurcation circuit 405 is 1:1:1, and the splitting ratio to the circuits 407*a* and 407*b* is set to 1:1. As a result, the intensities of the two optical signals reaching each of the first light multiplexing circuit 407*a* and the second light multiplexing circuit 407*b* are different from each other. Because the splitting ratio is 1:1:1, the first and second output optical signals from the light trifurcation circuit 405 are substantially ⅓ of the optical signal level from the waveguide 409*b*. On the other hand, the level of each split light of the light bifurcation circuit 404 is substantially ½ of the optical signal level from the waveguide 409*a*. Thus, the ratio of the two input light levels to the light multiplexing circuit 307*a* is ⅓:½=2:3, the two input light levels are different, and the two input light levels reaching the light multiplexing circuit 407*b* are similarly different from each other.

The MZI of the wavelength monitoring circuit 401 operates in a state of losing balance, and complete extinction does not occur in the interference light output. Thus, the bottom level of the transmission characteristic is raised, and the minimum value of the two curves plotting the ratios from the output ports 412*b* and 413*c* is not 0, but the value is approximately 1%. In the wavelength monitoring circuit of the present embodiment, by raising the level of the electrical signal near the bottom, a problem of a deterioration in the detection accuracy of the wavelength and weakness to the optical noise signal can be avoided.

Compared with a filter circuit which is applied to the decoder or the like of the phase modulation signal of the optical transceiver achieved by the PLC, by simply changing the light bifurcation circuit that outputs optical signals having a phase difference of 90 degrees to the light trifurcation circuit 405, an "output proportional to only the light intensity of the input optical signal" corresponding to the first output port 412*a* is obtained, and an effect for improving the resistance to the optical noise signal can be easily obtained. Further, to improve the resistance to the optical noise signal, the splitting ratio of any of the light bifurcation circuit 402 and the light multiplexing circuits 407*a* and 407*b* can be offset from 50:50. Further, the splitting ratio of the light trifurcation circuit 405 that outputs the first and second output optical signals having a phase difference of 90 degrees can be offset from the first output:second output: third output=1:1:1, while keeping the splitting ratio to the first and second output ports equal.

As long as the light trifurcation circuit 405 is utilized, the level of each split light is always less than ½, so that the MZI of the wavelength monitoring circuit 401 can always operate in a state of losing balance. By forming the wavelength monitoring circuit 401 of the present embodiment as a PLC on the same substrate, it is not susceptible to environmental changes, and it is unnecessary to adjust the arrangement between components required in the configuration of FIGS. 6 and 7, and a favorable performance can be easily obtained.

The wavelength monitoring circuits of the third and fourth embodiments described above are both common in that the "output proportional to only the light intensity of the input optical signal" corresponding to the optical signals from the first output ports 312*a* and 412*a* is extracted from a portion corresponding to the light trifurcation circuit (304, 405) of light that has been given a time delay difference in a stage in the middle of the circuit. By inputting the two outputs from the light trifurcation circuit and the two outputs from the light bifurcation circuit into the light multiplexing circuits 307*a*, 307*b*, 407*a*, and 407*b*, the MZI in the wavelength monitoring circuit 301, 401 is used in a configuration or an operation state in the balance as the interference circuit is lost. This unbalanced state is due to the provision of different levels of input light beams to the light multiplexing circuit at the final stage of the MZI. In other words, this unbalanced state depends on the fact that the levels of split light from the light bifurcation circuit and the light trifurcation circuit are different.

Consequently, the present disclosure includes an input light split circuit (302, 402) that split an input optical signal, an optical delay unit (303, 403), a light split stage, and a light multiplexing stage. The optical delay unit (303, 403) provides a time delay difference to two beams of split light from the input light split circuit (302, 402). The light split stage has a light trifurcation unit (304, 405) and a light bifurcation unit (305, 404). The light trifurcation unit is a light trifurcation unit (304, 405) that splits one of the optical signals output from the optical delay unit into first split light, second split light, and third split light, and outputs the first split light as a first light output. The light bifurcation unit (305, 404) splits the other of the optical signals output from the optical delay unit. When the second split light and the third split light are in the same phase, the split light beams from the light bifurcation unit have a phase difference of 90 degrees. Alternatively, when the second split light and the third split light have a phase difference of 90 degrees, the split light beams from the light bifurcation unit have the same phase. The light multiplexing stage has a first light multiplexing circuit (307*a*, 407*a*) and a second light multiplexing circuit (307*b*, 407*b*), and is connected to the light split stage by a waveguide (306, 406) of the same length. The first light multiplexing circuit (307*a*, 407*a*) obtains a second light output that is interference light, by multiplexing the second split light from the light trifurcation unit and one of the split light beams from the light bifurcation unit. Further, the second light multiplexing circuit (307*b*, 407*b*) obtains a third light output that is interference light, by multiplexing the third split light from the light trifurcation unit and the other of the split light beams from the light bifurcation unit. The present disclosure can be implemented as a wavelength monitoring circuit configured to determine the wavelength of the input optical signal, based on an electrical output obtained from the second light output and an electrical output obtained from the first light output, or an electrical output obtained from the third light output and an electrical output obtained from the first light output.

The wavelength monitoring circuit according to any of the embodiments described above can also be combined with other optical signal processing apparatuses including a memory and a CPU, or devices to operate as a wavelength monitoring apparatus or a wavelength monitoring system. In other words, the correspondence relationship between the values r2, r3 of the ratio of the electrical signals described above and the wavelength can be stored in advance in the memory as correspondence relationship information in a format such as a correspondence table. The correspondence relationship information is preferably performed for each wavelength monitoring circuit. In the wavelength monitoring circuit described above, the repetition period and phase difference of the two periodic transmission characteristics illustrated in FIG. 5 may vary depending on parameters of materials of the waveguide of the optical circuit, variations in waveguide dimensions, and the like. Consequently, after mounting a wavelength monitoring circuit on an optical signal processing apparatus and a device for wavelength monitoring, it is preferable to individually create correspondence information (for example, a correspondence table) of "ratio of wavelength to electrical signal". In this way, the wavelength monitoring circuit of the embodiment can be applied to a device such as a digital coherent light source that requires high accuracy wavelength control over the wavelength monitoring circuit.

It goes without saying that common correspondence relationship information may be applied to a plurality of wavelength monitoring circuits, instead of correspondence relationship information for each wavelength monitoring circuit, in the case where the accuracy of the wavelength determination required for the wavelength monitoring circuit may be low.

In any of the wavelength monitoring circuits described above, the path leading to the "first output ports" 112a, 212a, 312a, and 412a at which outputs proportional to only the light intensity of the input optical signal are obtained has been described as having a constant transmittance and no wavelength dependence. However, when a wavelength monitoring circuit that includes different communication bands and needs to cover a wide wavelength band, the transmittance may not be considered constant. For example, even with a simple functional light bifurcation circuit, the splitting ratio may be wavelength-dependent by assuming a wide wavelength band. Even in such a case, the accuracy of the wavelength determination can be maintained by storing correspondence relationship information for each wavelength monitoring circuit and storing the separate correspondence relationship information for each wavelength band for one wavelength monitoring circuit. Further, common correspondence relationship information is utilized without individually storing information in each wavelength monitoring circuit, but different correspondence relationship information can be stored for a plurality of wavelength bands.

The control unit (CPU) configured to perform processing such as reading of the correspondence relationship information from the memory, calculating the wavelength determination, and the like, for determining the wavelength from the values r2 and r3 of the ratio of the electrical signals may be provided in the optical signal processing apparatus combined with the wavelength monitoring circuit, or only one of the control units, for example, only the memory may be included in the wavelength monitoring circuit. It is also possible to provide a dedicated memory and a CPU in the wavelength monitoring circuit.

Consequently, the present disclosure can be implemented as a wavelength monitoring system including the wavelength monitoring circuit according to each of the above-described embodiments, a memory, and a control unit. The memory is a memory configured to store in advance the correspondence relationship information between a value of a first ratio of the electrical output obtained from the second light output and the electrical output obtained from the first light output, a value of a second ratio of the electrical output obtained from the second light output and the electrical output obtained from the first light output, and a wavelength. The control unit is a control unit configured to calculate the value of the first ratio and the value of the second ratio, determined from the first light output, the second light output, and the third light output from the wavelength monitoring circuit, and determine a wavelength of the input optical signal, based on the correspondence relationship information.

Further, an aspect as a disclosure of a wavelength monitoring method using the wavelength monitoring circuit of each of the above-described embodiments is also provided. In other words, the wavelength monitoring method can be implemented as a wavelength monitoring method including two steps to be described below. The first step described above is a step of storing, in a memory, the correspondence relationship information between the value of the first ratio of the electrical output obtained from the second light output and the electrical output obtained from the first light output, the value of the second ratio of the electrical output obtained from the second light output and the electrical output obtained from the first light output, and the wavelength, in the wavelength monitoring circuit of each embodiment described above. The second step described above is a step for calculating, by the control unit (CPU), the value of the first ratio and the value of the second ratio that are obtained from the first light output, the second light output, and the third light output from the wavelength monitoring circuit, and determining a wavelength of the input optical signal, based on the correspondence relationship information.

As described above, with the wavelength monitoring circuit of the present disclosure, highly accurate wavelength monitoring can be implemented while easily improving the resistance to noise by simply changing the configuration of the light split circuit, with respect to the filter circuit according to the related art.

INDUSTRIAL APPLICABILITY

The present disclosure may widely be utilized in communication systems. In particular, it can be utilized in optical communication systems.

REFERENCE SIGNS LIST 101, 201, 301, 401, 600-1, 600-2, 801 Wavelength monitoring circuit
102, 103, 302, 402, 802 Light bifurcation circuit
104, 203, 303, 403, 803 Optical delay unit
105, 204, 404, 804 Light bifurcation circuit outputting optical signals having the same phase
106, 205, 305, 805 Light bifurcation circuit outputting optical signals having phase difference of 90 degrees
107, 206, 306, 406, 806 Group of waveguides having same length
108a, 108b, 207a, 207b, 307a, 307b, 407a, 407b, 807a, 807b Light multiplexing circuit
109a to 109c, 208a to 208c, 308a to 308c, 408a to 408c Photoelectric conversion element (PD)
110a, 110b, 209a, 209b, 309a, 309b, 409a, 409b Waveguide
112, 212, 312, 412 Input port
113a to 113c, 213a to 213c, 312a to 312c, 412a to 412c Output port
202 Light trifurcation circuit
304 Light trifurcation circuit outputting optical signals having the same phase
405 Light trifurcation circuit outputting optical signals having phase difference of 90 degrees
601 Wavelength-variable laser 602, 603, 607 Beam splitter
604, 606, 609 Photo diode
605, 608 Etalon filter

The invention claimed is:

1. A wavelength monitoring circuit comprising:
an input light split circuit configured to split an input optical signal into three signals, and output first split light as a first light output;
an optical delay unit configured to give a time delay difference to second split light and third split light which are outputs from the input light split circuit;
a light split stage including a first light split unit configured to further split one of optical signals output from the optical delay unit into optical signals having an identical phase, and a second light split unit configured to further split another one of the optical signals output from the optical delay unit into optical signals having a phase difference of 90 degrees; and
a light multiplexing stage including a first light multiplexing circuit configured to obtain a second light output, which is interference light, by multiplexing one of the optical signals having the identical phase from the first light split unit and one of the optical signals having the phase difference of 90 degrees from the second light split unit, and a second light multiplexing circuit configured to obtain a third light output, which is interference light, by multiplexing another one of the optical signals having the identical phase from the first light split unit and another one of the optical signals having the phase difference of 90 degrees from the second light split unit, and connecting to the light split stage via waveguides having an equal length, wherein
a wavelength of the input optical signal is determined, based on an electrical output obtained from the second light output and an electrical output obtained from the first light output, or an electrical output obtained from the third light output and the electrical output obtained from the first light output, and
the input light split circuit includes a first input light split unit configured to receive the input optical signal, and output one of split light beams from the first input light split unit to the optical delay unit as the second split light, and a second input light split unit configured to receive another one of the split light beams from the first input light split unit, output one of split light beams from the second input light split unit to the optical delay unit as the third split light, and output another one of the split light beams from the second input light split unit as the first light output.

2. The wavelength monitoring circuit according to claim 1, wherein the wavelength monitoring circuit is configured with a planar optical circuit formed on a substrate.

3. A wavelength monitoring system comprising:
the wavelength monitoring circuit according to claim 1;
a memory configured to store, in advance, correspondence relationship information between a value of a first ratio of the electrical output obtained from the second light output and the electrical output obtained from the first light output, a value of a second ratio of the electrical output obtained from the second light output and the electrical output obtained from the first light output, and a wavelength; and
a control unit configured to calculate the value of the first ratio and the value of the second ratio that are obtained from the first light output, the second light output, and the third light output from the wavelength monitoring circuit, and determine a wavelength of the input optical signal, based on the correspondence relationship information.

4. A wavelength monitoring circuit comprising:
an input light split circuit configured to split an input optical signal into three signals, and output first split light as a first light output;
an optical delay unit configured to give a time delay difference to second split light and third split light which are outputs from the input light split circuit;
a light split stage including a first light split unit configured to further split one of optical signals output from the optical delay unit into optical signals having an identical phase, and a second light split unit configured to further split another one of the optical signals output from the optical delay unit into optical signals having a phase difference of 90 degrees; and
a light multiplexing stage including a first light multiplexing circuit configured to obtain a second light output, which is interference light, by multiplexing one of the optical signals having the identical phase from the first light split unit and one of the optical signals having the phase difference of 90 degrees from the second light split unit, and a second light multiplexing circuit configured to obtain a third light output, which is interference light, by multiplexing another one of the optical signals having the identical phase from the first light split unit and another one of the optical signals having the phase difference of 90 degrees from the second light split unit, and connecting to the light split stage via waveguides having an equal length, wherein
a wavelength of the input optical signal is determined, based on an electrical output obtained from the second light output and an electrical output obtained from the first light output, or an electrical output obtained from the third light output and the electrical output obtained from the first light output, and
the input light split circuit is a light trifurcation circuit configured to output the first split light, the second split light, and the third split light, and a splitting ratio of the second split light and the third split light is not equal.

5. A wavelength monitoring circuit comprising:
an input light split circuit configured to split an input optical signal;
an optical delay unit configured to give a time delay difference to two beams of split light from the input light split circuit;
a light split stage including a light trifurcation unit configured to split one of optical signals output from the optical delay unit into first split light, second split light, and third split light, and to output the first split light as a first light output and a light bifurcation unit configured to split another one of the optical signals output from the optical delay unit, wherein, when the second split light and the third split light have an identical phase, split light beams from the light bifurcation unit have a phase difference of 90 degrees, and, when the second split light and the third split light have a phase difference of 90 degrees, the split light beams from the light bifurcation unit have an identical phase; and
a light multiplexing stage including a first light multiplexing circuit configured to obtain a second light output, which is interference light, by multiplexing the second split light from the light trifurcation unit and one of the split light beams from the light bifurcation unit, and a second light multiplexing circuit configured to obtain a third light output, which is interference light, by multiplexing the third split light from the light trifurcation unit and another one of the split light beams from the light bifurcation unit, and connecting to the light split stage via waveguides having an equal length, wherein a wavelength of the input optical signal is determined, based on an electrical output obtained from the second light output and an electrical output obtained from the first light output, or an electrical output obtained from the third light output and the electrical output obtained from the first light output.

6. The wavelength monitoring circuit according to claim 5, wherein the light trifurcation unit outputs the second split light and the third split light having an identical phase.

7. The wavelength monitoring circuit according to claim 5, wherein the light trifurcation unit outputs the second split light and the third split light having a phase difference of 90 degrees.

8. The wavelength monitoring circuit according to claim 5, wherein the wavelength monitoring circuit is configured with a planar optical circuit formed on a substrate.

9. A wavelength monitoring system comprising:

the wavelength monitoring circuit according to claim 5;

a memory configured to store, in advance, correspondence relationship information between a value of a first ratio of the electrical output obtained from the second light output and the electrical output obtained from the first light output, a value of a second ratio of the electrical output obtained from the second light output and the electrical output obtained from the first light output, and a wavelength; and a control unit configured to calculate the value of the first ratio and the value of the second ratio that are obtained from the first light output, the second light output, and the third light output from the wavelength monitoring circuit, and determine a wavelength of the input optical signal, based on the correspondence relationship information.

* * * * *